US008762970B2

(12) United States Patent
Kawahito

(10) Patent No.: US 8,762,970 B2
(45) Date of Patent: Jun. 24, 2014

(54) METHOD, COMPUTER PROGRAM AND COMPUTER SYSTEM FOR ASSISTING IN ANALYZING PROGRAM

(75) Inventor: Motohiro Kawahito, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 1166 days.

(21) Appl. No.: 12/636,899

(22) Filed: Dec. 14, 2009

(65) Prior Publication Data

US 2010/0153923 A1 Jun. 17, 2010

(30) Foreign Application Priority Data

Dec. 15, 2008 (JP) .................................. 2008-318865

(51) Int. Cl.
*G06F 9/45* (2006.01)
(52) U.S. Cl.
CPC ....................... *G06F 8/40* (2013.01)
USPC ........... 717/144; 717/104; 717/105; 717/131; 717/132; 717/133; 717/151; 717/154; 717/155; 717/156; 717/157
(58) Field of Classification Search
None
See application file for complete search history.

(56) References Cited

U.S. PATENT DOCUMENTS

| | | | | |
|---|---|---|---|---|
| 5,212,794 A | * | 5/1993 | Pettis et al. ................... | 717/153 |
| 5,950,009 A | * | 9/1999 | Bortnikov et al. ............ | 717/158 |
| 6,343,376 B1 | * | 1/2002 | Saxe et al. ..................... | 717/154 |
| 6,594,822 B1 | * | 7/2003 | Schweitz et al. .............. | 717/140 |
| 6,654,952 B1 | * | 11/2003 | Nair et al. ..................... | 717/157 |
| 6,848,100 B1 | * | 1/2005 | Wu et al. ....................... | 717/157 |
| 7,058,941 B1 | * | 6/2006 | Venkatesan et al. .......... | 717/168 |
| 7,409,679 B2 | * | 8/2008 | Chedgey et al. .............. | 717/144 |
| 8,166,466 B2 | * | 4/2012 | Mohanan et al. ............. | 717/144 |
| 8,312,052 B2 | * | 11/2012 | Larriba Pey et al. .......... | 707/798 |
| 8,429,628 B2 | * | 4/2013 | Spurlin ......................... | 717/144 |
| 2003/0120642 A1 | * | 6/2003 | Egilsson et al. ................. | 707/3 |
| 2007/0239993 A1 | * | 10/2007 | Sokolsky et al. ............. | 713/188 |
| 2009/0106744 A1 | * | 4/2009 | Li et al. ......................... | 717/151 |

(Continued)

FOREIGN PATENT DOCUMENTS

| | | | | |
|---|---|---|---|---|
| JP | 2003-330730 A | 11/2003 | ................ | G06F 9/45 |
| JP | 2007-193482 A | 8/2007 | .............. | G06F 17/30 |

OTHER PUBLICATIONS

'Instruction-Level Parallelism for Reconfigurable Computing' by Timothy J. Callahan and John Wawrzynek, Lecture Notes in Computer Science vol. 1482, 1998, pp. 248-257.*

(Continued)

*Primary Examiner* — Steven Snyder
(74) *Attorney, Agent, or Firm* — Cantor Colburn LLP; Gail Zarik

(57) ABSTRACT

A method for grouping algorithms included in a program into groups and thus for assisting in analyzing the program. The method includes the steps of: converting each of the algorithms into a directed graph; judging, as to each representative directed graph stored in a storage unit of a computer system, whether or not the directed graph obtained by the conversion is similar to the representative directed graph; and determining a group to which the directed graph obtained by the conversion belongs from among groups stored in the storage unit in accordance with the similarity judgment. A computer system for performing the above method and a computer program for causing a computer system to perform the above method are also described.

21 Claims, 12 Drawing Sheets

(56) References Cited

U.S. PATENT DOCUMENTS

| | | | | |
|---|---|---|---|---|
| 2009/0172650 | A1* | 7/2009 | Spurlin | 717/144 |
| 2010/0060643 | A1* | 3/2010 | Kolipaka et al. | 345/440 |
| 2010/0275186 | A1* | 10/2010 | McGarvey et al. | 717/132 |
| 2011/0067010 | A1* | 3/2011 | Dullien et al. | 717/132 |
| 2013/0019224 | A1* | 1/2013 | Madl et al. | 717/104 |

OTHER PUBLICATIONS

'Programmer-friendly Decompiled Java' by Nomair A. Naeem and Laurie Hendren, Proceedings of the 14th IEEE International Conference on Program Comprehension, copyright 2006, IEEE.*

'Programmer-Friendly Decompiled Java' a thesis by Nomair A. Naeem, School of Computer Science, McGill University, Montreal, Aug. 2006.*

'The Program Dependence Graph and Its Use in Optimization' by Jeanne Ferrante et al., copyright 1987, ACM Transactions on Programming Languages and Systems, vol. 9, No. 3, Jul. 1987.*

Lee, et al., "Fuel Consumption Prediction Model of Vehicle using Neural Networks", Dept. of U-Embedded Convergence Research Center, Korea Electronics Technology.

Method using a code clone, http://www.ccfinder.net/doc/vaci/sigss-20080530.pdf, Translation, 2008.

James Jianghai Fu, "Directed Graph Pattern Matching and Topological Embedding", Journal of Algorithms 22, 372-391 (1997), Article No. AL960818.

Siji Hotta et al., Visualization of Data Structures . . . Graphs, The Institute of Image Information and Television Engineering, Dec. 20, 2000, Vol, 54, No. 12, p. 1748-1755.

Sayaka Kuroki, et al., A similar Code Search . . . Codes, The Institution of Electronics, Information and Communication Engineers, The 19th Data Engineering Workshop Apr. 7, 2008.

* cited by examiner

```
int Method1(int start, int end) {
    for (int i = start; i < end; ){ // LOOP 1 EXECUTION FREQUENCY 20
        if (array[i] == 0x0d) return i;
        i++;
    }
    return -1;
}
```
— 411

```
void Method2(int start, int end) {
    for (int i = start; i < end; i++){  // LOOP 2 EXECUTION FREQUENCY 25
        array1[i] = 0;
        array2[i] = 0;
    }
}
```
— 412

```
int Method3(int start, int end) {
    for (int i = start; i < end; ){ // LOOP 3 EXECUTION FREQUENCY 20
        i++;
        if (array[i] == 0x0d) return i;
    }
    return -1;
}
```
— 413

```
int Mvoid Method4(int start, int end) {
    for (int i = start; i < end; i++){  // LOOP 4 EXECUTION FREQUENCY 5
        array[i] = 0;
    }
}
```
— 414

```
EXECUTION FREQUENCY 40
    for (int i = start; i < end; ) {
        if (array[i] == 0x0d) return i;
        i++;
    }

EXECUTION FREQUENCY 30
    for (int i = start; i < end; i++) {
        array[i] == 0
    }
```

432

```
REPRESENTATIVE ALGORITHM: LOOP 1
EXECUTION FREQUENCY 40
    for (int i = start; i < end; ) {
        if (array[i] == 0x0d) return i;
        i++;
    }
ALGORITHMS BELONGING TO GROUP: LOOP 1, LOOP 3

REPRESENTATIVE ALGORITHM: LOOP 4
EXECUTION FREQUENCY 30
    for (int i = start; i < end; i++) {
        array[i] = 0;
    }
ALGORITHMS BELONGING TO GROUP: LOOP 2, LOOP 4
```

FIG. 4C

|  | if < | load | if == | add | store | assign |
|---|---|---|---|---|---|---|
| DIRECTED GRAPH 1 (LOOP 1) | 1 | 1 | 1 | 1 | 0 | 1 |
| DIRECTED GRAPH 2 (LOOP 2) | 1 | 0 | 0 | 1 | 1 | 1 |
| DIRECTED GRAPH 3 (LOOP 3) | 1 | 1 | 1 | 1 | 0 | 1 |
| DIRECTED GRAPH 4 (LOOP 4) | 1 | 0 | 0 | 1 | 1 | 1 |

METHOD, COMPUTER PROGRAM AND COMPUTER SYSTEM FOR ASSISTING IN ANALYZING PROGRAM

CROSS REFERENCE TO RELATED APPLICATION

This application claims priority under 35 U.S.C. 119 from Japanese Patent Application 2008-318865, filed Dec. 15, 2008, the entire contents of which are incorporated herein by reference

BACKGROUND OF THE INVENTION

1. Field of the Invention

The present invention relates to a method, a computer program and a computer system for assisting in analyzing a program.

2. Description of Related Art

As program size has increased, a desire for further performance improvement of a program has arisen. To analyze the performance of a program, developers use a method of visually examining frequently executed methods. However, due to the increase in size of recent programs, it is often the case that programs include no exceptionally frequently used method. In addition, one of the problems of the analysis method is that a developer examines a program on a method-by-method basis.

In this regard, there are methods of performing an optimization analysis by collecting similar codes of a program. Similarity of program execution characteristics is determined in one method of analyzing similar codes of a program. The program execution characteristics are, for example, CPI (Cycles Per Instruction), the number of instructions, and branch characteristics.

Another method is based on source code characteristics. The source code characteristics are, for example, the number of lines, the number of variables and the number of operators.

An example of the method based on source code characteristics is a method of dividing source code into tokens, converting user-defined names and constants into certain symbols, and then detecting matching parts. A typical example of such a method is CCFinder.

In CCFinder, source code is judged on a token-by-token basis, and this makes it possible to handle a difference in parameters such as name and constant value. See Toshihiro Kamiya, "Identifier Variation Analysis Using Code Clone as Template", May 30, 2008, National Institute of Advanced Industrial Science and Technology.

However, CCFinder cannot handle a difference in logics. For example, in CCFinder, if a program written using for loop statements is rewritten using while loop statements, the two programs are treated as different logics.

When a developer analyzes the performance of a program, expected effects are not always obtained by performing the analysis on a method-by-method basis. Such being the case, desired has been a method which enables detection of similar logics based on a context of the program.

SUMMARY OF THE INVENTION

In accordance with one aspect of the present invention, a method for grouping algorithms included in a program into groups to assist in analyzing the program includes the steps of: converting each of the algorithms into a directed graph, the directed graph including a plurality of nodes and one or more edges each connecting two of the nodes; judging, as to each of a plurality of representative directed graphs corresponding respectively to the groups and stored in a storage unit of a computer system, whether or not the directed graph obtained by the conversion is similar to the representative directed graph, wherein the representative directed graph is a directed graph including the smallest number of the nodes among directed graphs belonging to the corresponding group; and determining a group to which the directed graph obtained by the conversion belongs from among groups stored in the storage unit in accordance with the similarity judgment.

In accordance with another aspect of the present invention, a method for grouping algorithms included in a program into groups to assist in analyzing the program includes the steps of: converting each of the algorithms into a directed graph, the directed graph including a plurality of nodes and one or more edges each connecting two of the nodes; judging, as to each of representative directed graphs corresponding respectively to the groups and stored in a storage unit of a computer system, whether or not the directed graph obtained by the conversion is similar to the representative directed graph, the representative directed graph being a directed graph including the smallest number of the nodes among directed graphs belonging to the corresponding group; determining a group to which the directed graph obtained by the conversion belongs from among groups stored in the storage unit in accordance with the similarity judgment; calculating execution frequency of a group on the basis of execution frequency of the determined group, the execution frequency stored in the storage unit, and execution frequency of the directed graph obtained by the conversion; and displaying, for each of the groups, an algorithm corresponding to the representative directed graph and execution frequency of the group to which the representative directed graph belongs.

In accordance with a further aspect of the present invention a computer system for grouping algorithms included in a program into groups to assist in analyzing the program includes: a conversion unit converting each of the algorithms into a directed graph, the directed graph including a plurality of nodes and one or more edges each connecting two of the nodes; a storage unit storing at least one directed graph belonging to at least one group; a judgment unit judging, as to each of representative directed graphs corresponding respectively to the groups, whether or not the directed graph obtained by the conversion is similar to the representative directed graph, the representative directed graph being a directed graph including the smallest number of the nodes among directed graphs belonging to the corresponding group; and a determination unit determining a group to which the directed graph obtained by the conversion belongs from among groups stored in the storage unit in accordance with the similarity judgment.

In accordance with yet another aspect of the present invention, a computer program when executed on a computer will cause the computer to perform the steps of the method described above.

BRIEF DESCRIPTION OF THE DRAWINGS

For more complete understanding of the present invention and advantage thereof, reference is now made to the following description taken in conjunction with the accompanying drawings.

FIG. 4A shows an example of a program of input information, in an embodiment of the present invention.

FIG. 4C shows examples of a display result, in an embodiment of the present invention.

FIG. 5 shows an example of bitmaps, in an embodiment of the present invention.

DETAILED DESCRIPTION OF THE PREFERRED EMBODIMENTS

Figure 1A:
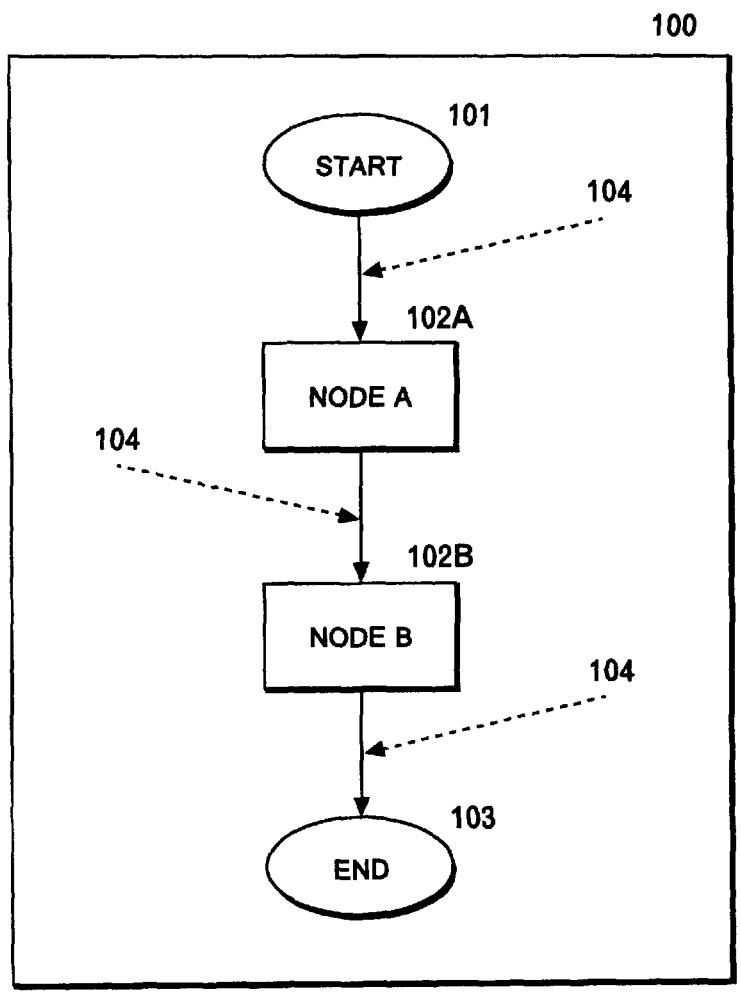
FIG. 1A shows an example of a directed graph obtained by converting an algorithm, according to an embodiment of the present invention.

In embodiments of the present invention, an "algorithm" is a procedure for completing a certain task. The procedure is written by using code. In the embodiments of the present invention, the "algorithm" includes some parts of the code. The code parts are, for example, a loop code and a conditional branch code. The loop code is a for statement or a while statement, for example. The conditional branch code is an if statement or a case statement, for example.

In the embodiments of the present invention, "grouping algorithms" means to group together codes having similar structures.

The group is represented by a structure. The structure includes, as elements, a directed graph representing the group (a representative directed graph, below) and the execution frequency of the group. Moreover, the structure can include, as optional elements, all directed graphs belonging to the group.

Further, in the embodiments of the present invention, a collection of groups is called a group table.

In the embodiments of the present invention, a "directed graph" is a graph having nodes and edges each connecting a pair of the nodes. Each edge has a direction, and indicates the direction of transition between the corresponding nodes. The algorithm is converted into a directed graph. Here, parts of the algorithm to which the nodes and the edges correspond depend on the type of the directed graph.

The directed graph may be a control flow graph (CFG), an abstract syntax tree (AST) or a program dependence graph (PDG), for example.

The control flow graph is a directed graph representing all paths which may be traversed during execution of a program. For details of the control graph, see the following URL (URL: http://ja.wikipedia.org/wiki/%E5%88%B6%E5% BE% A1%E3%83%95%E3%83%AD%E3%83%BC%E3%82% B0%E3%83%A9%E3%83%95).

The abstract syntax tree is a finite, labeled tree structure. For details of the abstract syntax tree, see the following URL (URL: http://ja.wikipedia.org/wiki/%E6%8A%BD%E8% B1%A1%E6%A7%8B%E6%96%87%E6%9C%A8).

The program dependence graph is a directed graph designed for hierarchical analysis of dependencies in a program. A node represents a statement, a predicate expression, an operator or an operand, for example. An edge represents a value of operation request data associated with corresponding nodes, and/or a control state of an execution request. For details of the program dependence graph, see Jeanne Ferrante et al., "The program dependence graph and its use in optimization," ACM Transactions on Programming Languages and Systems, TOPLAS, Vol. 9, No. 3, pages 319-349, July 1987.

In the embodiments of the present invention, a "representative directed graph" is a directed graph representing the group to which the directed graphs belong. The representative directed graph is a directed graph having the smallest number of nodes among the directed graphs belonging to the group.

In the embodiments of the present invention, "being similar" means that two directed graphs share a certain feature. In one embodiment of the present invention, a first directed graph and a second directed graph are similar if the first directed graph includes a first node, a second node and a path from the first node to the second node, and if the second directed graph includes a third node, a fourth node and a path from the third node to the fourth node, and if the third node corresponds to the first node and the fourth node corresponds to the second node. Moreover, including a path means to reach the second node by following nodes in the direction indicated by edges from the first node. Here, the first node and the second node do not need to be connected directly. For example, if there are a path between the first node and a fifth node and a path between the fifth node and the second node, this provides a path from the first node to the second node.

Nodes have the same properties are defined as corresponding to each other. In the embodiments of the present invention, if nodes have the same properties, i.e., nodes correspond to each other, they are considered to be the same node. An example of the properties of nodes is data type when nodes correspond to variables. Two nodes can be considered as the same node as long as having the same data type even if having different variable names. By contrast, if having different data types, two nodes are considered to be different nodes even in the case of having the same variable name.

In the embodiments of the present invention, "similarity" is a degree representing how much two directed graphs are alike. The similarity becomes effective only when two directed graphs satisfy the condition for being similar described in the preceding paragraph. The similarity is obtained on the basis of: at least one of the number of nodes included in both of the two similar directed graphs and the number of paths between the nodes; and at least one of the number of nodes included in one of the two similar directed graphs and the number of paths each having one of the nodes as its start point or its end point.

For example, the similarity can be obtained by $N1/(N1+N2) \times 100$. Here, N1 denotes at least one of the number of nodes included in both of the two similar directed graphs and the number of paths between the nodes. N2 denotes at least one of the number of nodes included in one of the two similar directed graphs and the number of paths each having one of the nodes as its start point or its end point. For example, assume that the number of nodes included in both of the two similar directed graphs is two, that the number of paths between the two nodes is one, that the number of nodes included in one of the two similar directed graphs is one, and that the number of paths each having the node as its start point or its end point is two. In this case, the similarity based on the nodes is $2/(2+1) \times 100 \approx 66.7$, the similarity based on the paths is 1/(1+2)×100≈33.3, and the similarity based on the nodes and the paths is 3/(3+3)×100=50.

In another embodiment, the similarity corresponds to a value obtained by dividing the total number of nodes included in both of the two similar directed graphs by the total number of all nodes included in the two similar directed graphs, and then multiplying the resultant value by 100.

In the embodiments of the present invention, if the similarity of two directed graphs is not larger than a threshold, the two directed graphs can be treated as "not being similar." Here, assume that the similarity corresponds to similarity based on the nodes, for example. In this case, the threshold may be set at 70% to 80% if the number of the nodes included in the two graphs is large, and may be set at 50% to 60% if the number of the nodes is small.

In one embodiment of the present invention, the embodiment different from the above-described one, the similarity may be determined, for example, by using a conventional method as one described in the Toshihiro Kamiya document mentioned above.

In the embodiments of the present invention, the "execution frequency" is a frequency at which processing using the algorithms is executed during execution of the program. In one embodiment of the present invention, the execution frequency can be obtained by using a value acquired from a profiler or a static technique (compiler). For a method of obtaining execution frequency by using a profiler or a static technique, see Tim A. Wagner, et al., "Accurate static estimators for program optimization," ACM 1994. In another embodiment of the present invention, the execution frequency may be determined by estimation by a user on the basis of a result of a test run of the program.

In the embodiments of the present invention, the "execution frequency" can be estimated, for example, by a profile or a static technique. The profile is obtained on the basis of a program to be eventually used and by executing the program. For example, the following URL shows an example of the profile in a GNU compiler collection (GCC), which is a group of GNU compilers (URL: http://gcc.gnu.org/onlinedocs/gccint/Profile-information.html).

Estimation by the static technique is performed by examining the structure of the program, e.g., a loop nest structure, and then estimating elements of dynamic behavior by using the obtained information.

In the embodiments of the present invention, the "execution frequency of a group" is a value obtained on the basis of the execution frequencies of the directed graphs belonging to the group. The execution frequency of the group corresponds, for example, to the total of the execution frequencies of the directed graphs belonging to the group. If the directed graphs belonging to the group are a first directed graph having an execution frequency of 10 and a second directed graph having an execution frequency of 50, the execution frequency of the group is 60.

In another embodiment, the execution frequency of the group corresponds to the total of values obtained by multiplying the execution frequencies of the directed graphs belonging to the group by a coefficient. If the directed graphs belonging to the group are the first directed graph having an execution frequency of 10 and the second directed graph having an execution frequency of 50 while the coefficient is 0.5, the execution frequency of the group is 30.

The embodiments of the present invention are described below with reference to the accompanying drawings. It is to be understood that the embodiments are intended to explain preferred modes of the present invention, and are hence not intended to limit the scope of the present invention to the embodiments to be described below. In addition, the same reference numerals denote the same subjects in all the drawings unless otherwise noted.

FIG. 1A shows an example of a directed graph obtained by converting an algorithm, according to an embodiment of the present invention.

A directed graph 100 includes a start node 101, a node A 102A, a node B 102B, an end node 103 and edges 104.

The start node 101 indicates the start of the directed graph 100. The start node 101 corresponds to the start of the algorithm. When an algorithm is converted into a directed graph, such a start node is not generated in some cases.

The nodes A and B, 102A and 102B, each represent a set of processes in the directed graph 100. Parts of the algorithm to which the nodes A and B, 102A and 102B, correspond depend on the type of the directed graph.

The end node 103 indicates the end of the directed graph 100. The end node 103 corresponds to the end of the algorithm. When an algorithm is converted into a directed graph, such an end node is not generated in some cases.

The edges 104 each indicate a connection between a corresponding pair of nodes and the direction of the connection. Parts of the algorithm to which the edges 104 correspond depend on the type of the directed graph.

In the directed graph 100, the start node 101 and the node A 102A are connected in the direction from the start node 101 to the node A 102A. The node A 102A and the node B 102B are connected in the direction from the node A 102A to the node B 102B. The node B 102B and the end node 103 are connected in the direction from the node B 102B to the end node 103.

Figure 1B:
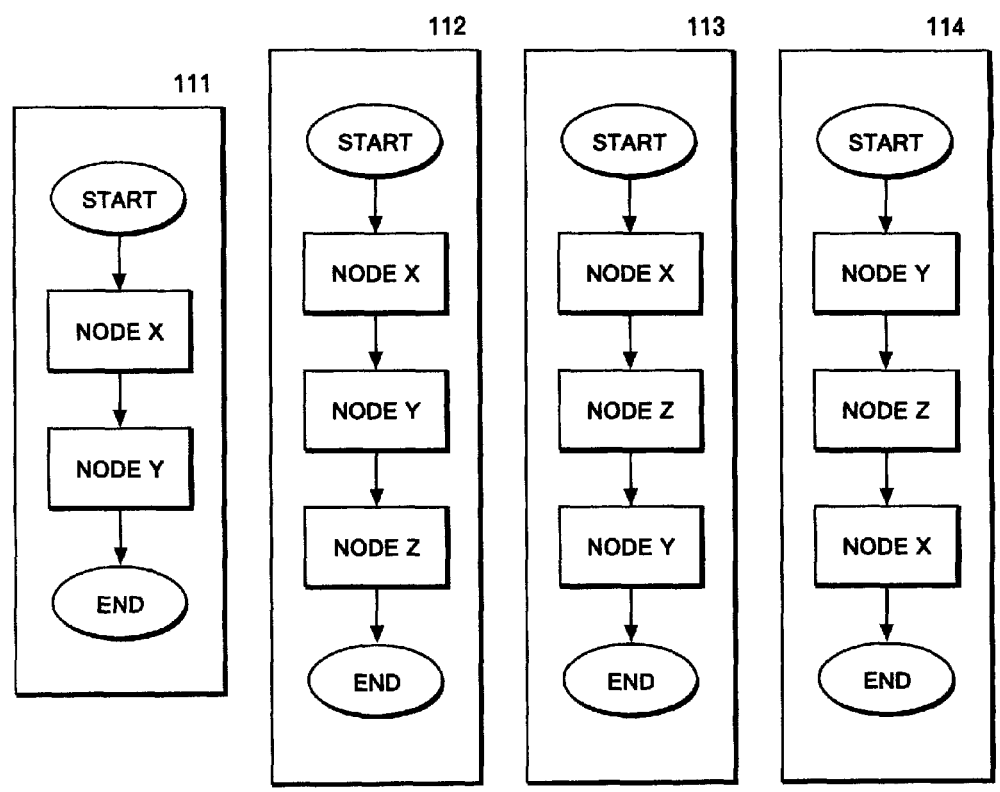
FIG. 1B shows an example of similarity judgment on directed graphs, in an embodiment of the present invention.

FIG. 1B shows an example of similarity judgment on directed graphs, according to an embodiment of the present invention.

A directed graph 111 includes a node X and a node Y. The node X and the node Y are connected with an edge in the direction from the node X to the node Y. Thus, the directed graph 111 includes a path from the node X to the node Y.

A directed graph 112 includes the node X, the node Y and a node Z. The node X and the node Y are connected with an edge in the direction from the node X to the node Y. The node Y and the node Z are connected with an edge in the direction from the node Y to the node Z. Accordingly, in the directed graph 112, the node X, the node Y and the node Z are reached in this order. Thus, the directed graph 112 includes a path from the node X to the node Y. This means that the directed graph 112 includes all the nodes, the node X and the node Y, and the path from the node X to the node Y included in the directed graph 111. Hence, the directed graph 112 is similar to the directed graph 111.

A directed graph 113 includes the node X, the node Z and the node Y. The node X and the node Z are connected with an edge in the direction from the node X to the node Z. The node Z and the node Y are connected with an edge in the direction from the node Z to the node Y. Accordingly, in the directed graph 113, the node X, the node Z and the node Y are reached in this order. Thus, the directed graph 113 includes a path from the node X to the node Y. This means that the directed graph 113 includes all the nodes, the node X and the node Y, and the path from the node X to the node Y included in the directed graph 111. Hence, the directed graph 113 is similar to the directed graph 111.

A directed graph 114 includes the node Y, the node Z and the node X. The node Y and the node Z are connected with an edge in the direction from the node Y to the node Z. The node Z and the node X are connected by an edge in the direction from the node Z to the node X. Accordingly, in the directed graph 114, the node Y, the node Z and the node X are reached in this order. Thus, the directed graph 114 includes a path from the node Y to the node X while not including a path from the node X to the node Y. Hence, the directed graph 114 is not similar to the directed graph 111.

As described above, the directed graph 112 and the directed graph 113 are both similar to the directed graph 111. However, the directed graph 112 and the directed graph 113 are not similar. This is because the directed graph 112 does not include a path from the node Z to the node Y included in the directed graph 113, and the directed graph 113 does not include a path from the node Y to the node Z included in the directed graph 112.

In the above example, two directed graphs are considered to be similar when one of the directed graphs includes all the nodes corresponding to the nodes included in the other directed graph and when all the paths between the nodes included in the other directed graph correspond to a part of or all of the paths between the nodes included in the one directed graph.

Alternatively, the two graphs may be considered to be similar in the following case. Specifically, the one directed graph includes at least two nodes and includes a first node, a second node and a path from the first node to the second node; the other directed graph includes at least two nodes and includes a third node, a fourth node and a path from the third node to the fourth node; and the third node corresponds to the first node while the fourth node corresponds to the second node. For example, since the directed graph 112 and the directed graph 113 each include the node X, the node Y and the node Z, and also include a path from the node X to the node Y and a path from the node X to the node Z, the directed graph 112 and the directed graph 113 may be considered to be similar. This similarity judgment can prevent a situation where no similar graphs are found, by judging directed graphs having the largest number of corresponding paths to be similar if there are no graphs including all corresponding paths between the nodes.

Figure 1C:
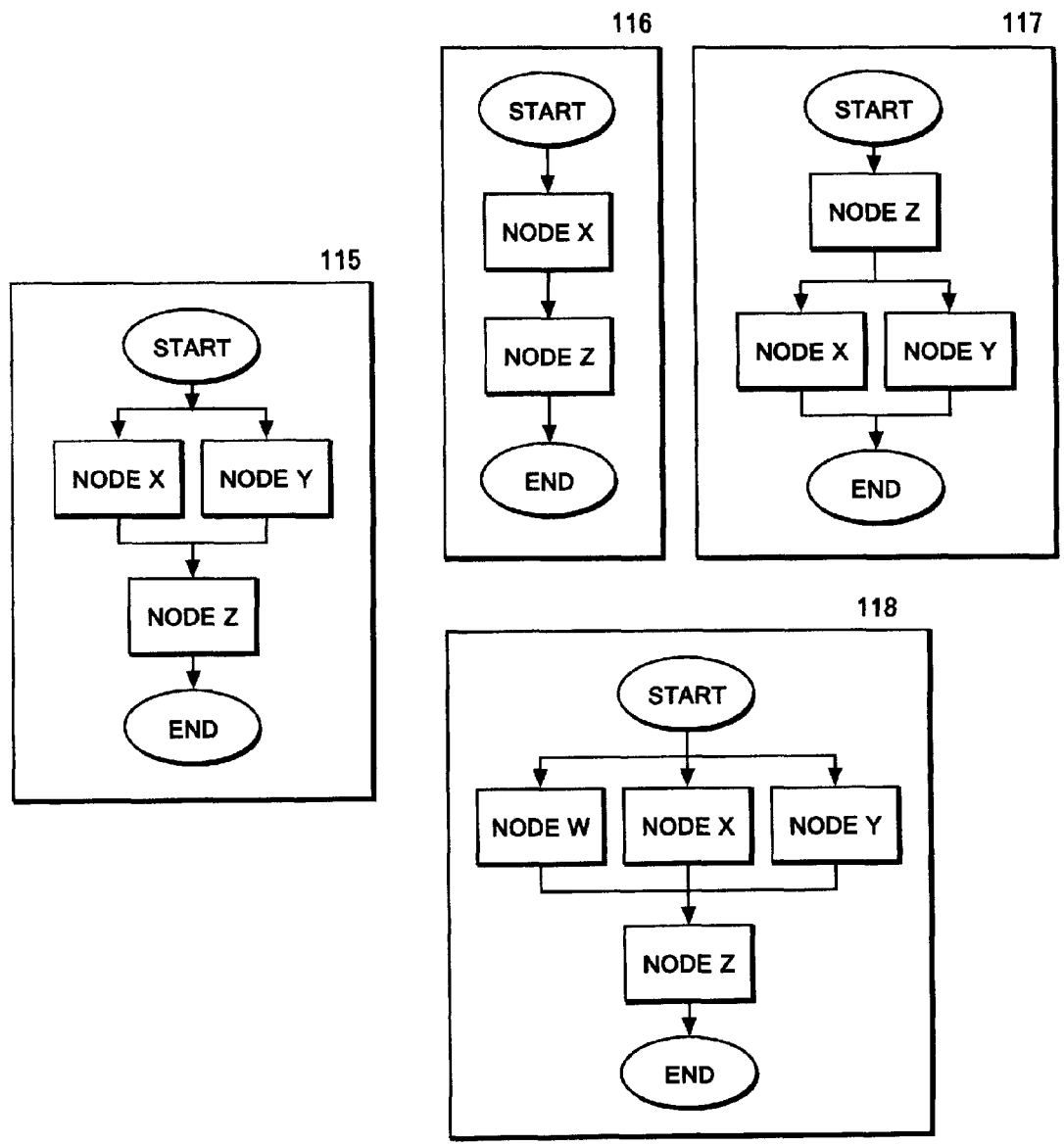
FIG. 1C shows an example of similarity judgment on directed graphs including branches, in an embodiment of the present invention.

FIG. 1C shows an example of similarity judgment on directed graphs including branches, according to an embodiment of the present invention.

A directed graph 115 includes a node X, a node Y and a node Z. The node X and the node Z are connected with an edge in the direction from the node X to the node Z. The node Y and the node Z are connected with an edge in the direction from the node Y to the node Z. Thus, the directed graph 115 includes a path to the node Z from each of the node X and the node Y.

A directed graph 116 includes the node X and the node Z. The node X and the node Z are connected with an edge in the direction from the node X to the node Z. Thus, the directed graph 116 includes a path from the node X to the node Z. This means that all the nodes, the node X and the node Z, and the path from the node X to the node Z included in the directed graph 116 are included in the directed graph 115. Hence, the directed graph 116 is similar to the directed graph 115.

A directed graph 117 includes the node Z, the node X and the node Y. The node Z and the node X are connected with an edge in the direction from the node Z to the node X. The node Z and the node Y are connected with an edge in the direction from the node Z to the node Y. Accordingly, the directed graph 117 includes a path from the node Z to each of the node X and the node Y. However, the directed graph 117 does not include a path to the node Z from each of the node X and the node Y. Moreover, the directed graph 115 does not include a path from the node Z to each of the node X and the node Y. Hence, the directed graph 117 is not similar to the directed graph 115.

A directed graph 118 includes a node W, the node X, the node Y and the node Z. The node W and the node Z are connected with an edge in the direction from the node W to the node Z. The node X and the node Z are connected with an edge in the direction from the node X to the node Z. The node Y and the node Z are connected with an edge in the direction from the node Y to the node Z. Thus, the directed graph 118 includes a path to the node Z from each of the nodes W to Y. This means that all the nodes, the nodes X to Z, and the paths from the node X to the node Z and the path from the node Y to the node Z included in the directed graph 115 are included in the directed graph 118. Hence, the directed graph 118 is similar to the directed graph 115.

Figure 1D:
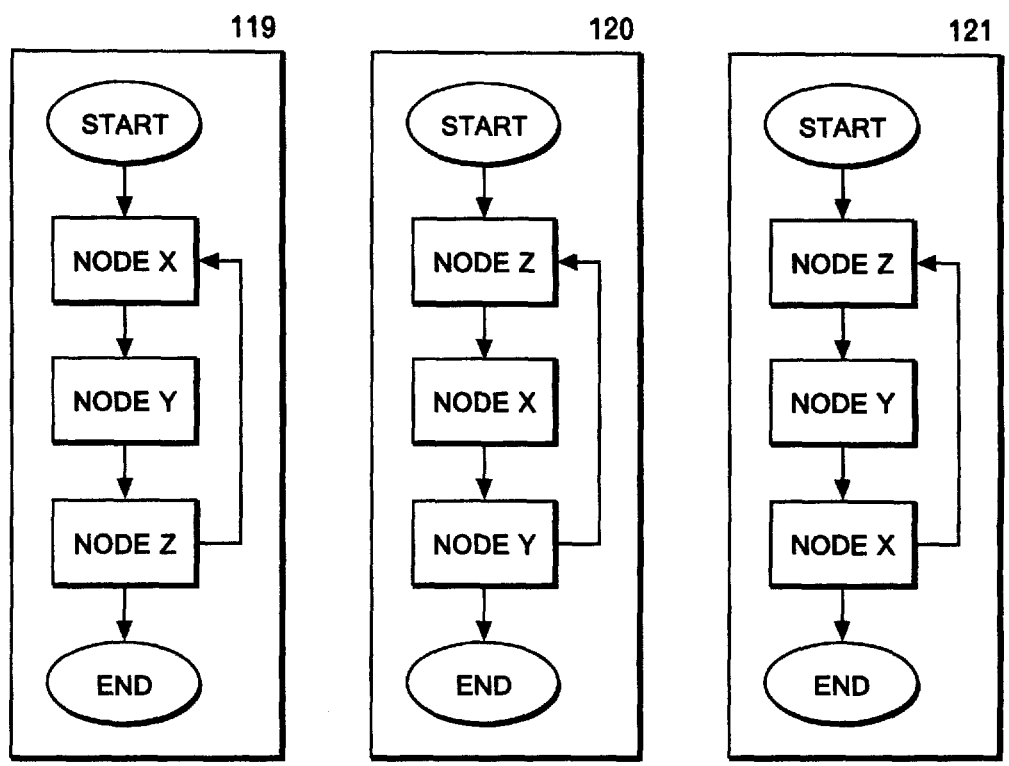
FIG. 1D shows an example of similarity judgment on directed graphs including loops, in an embodiment of the present invention.

FIG. 1D shows an example of similarity judgment on directed graphs including loops, according to the present invention.

The directed graph 119 includes a node X, a node Y and a node Z. The node X and the node Y are connected with an edge in the direction from the node X to the node Y. The node Y and the node Z are connected with an edge in the direction from the node Y to the node Z. The node Z and the node X are connected with an edge in the direction from the node Z to the node X. Accordingly, in the directed graph 119, the nodes can be reached in the order of the node X, the node Y, the node Z, then node X . . . (repetition). Thus, the directed graph 119 includes a path from any of the nodes X to Z to any of the nodes X to Z.

A directed graph 120 includes the node Z, the node X and the node Y. The node Z and the node X are connected with an edge in the direction from the node Z to the node X. The node X and the node Y are connected with an edge from the node X to the node Y. The node Y and the node Z are connected with an edge from the node Y to the node Z. Accordingly, in the directed graph 120, the nodes can be reached in the order of the node Z, the node X, the node Y, then node Z . . . (repetition). Thus, the directed graph 120 includes a path from any of the nodes X to Z to any of the nodes X to Z. Hence, the directed graph 120 is similar to the directed graph 119.

A directed graph 121 includes the node Z, the node Y and the node X. The node Z and the node Y are connected with an edge in the direction from the node Z to the node Y. The node Y and the node X are connected with an edge in the direction from the node Y to the node X. The node X and the node Z are connected with an edge in the direction from the node X to the node Z. Accordingly, in the directed graph 121, the nodes can be reached in the order of the node Z, the node Y, the node X, then node Z . . . (repetition). Thus, the directed graph 121 also includes a path from any of the nodes X to Z to any of the nodes X to Z. Hence, the directed graph 121 is similar to the directed graph 119.

As described above, in a directed graph with a loop, each of all nodes included in the loop has a path to each of all the other nodes included in the loop. For this reason, the directed graphs 119 to 121 having the same nodes in their loops are all similar.

Figure 2:
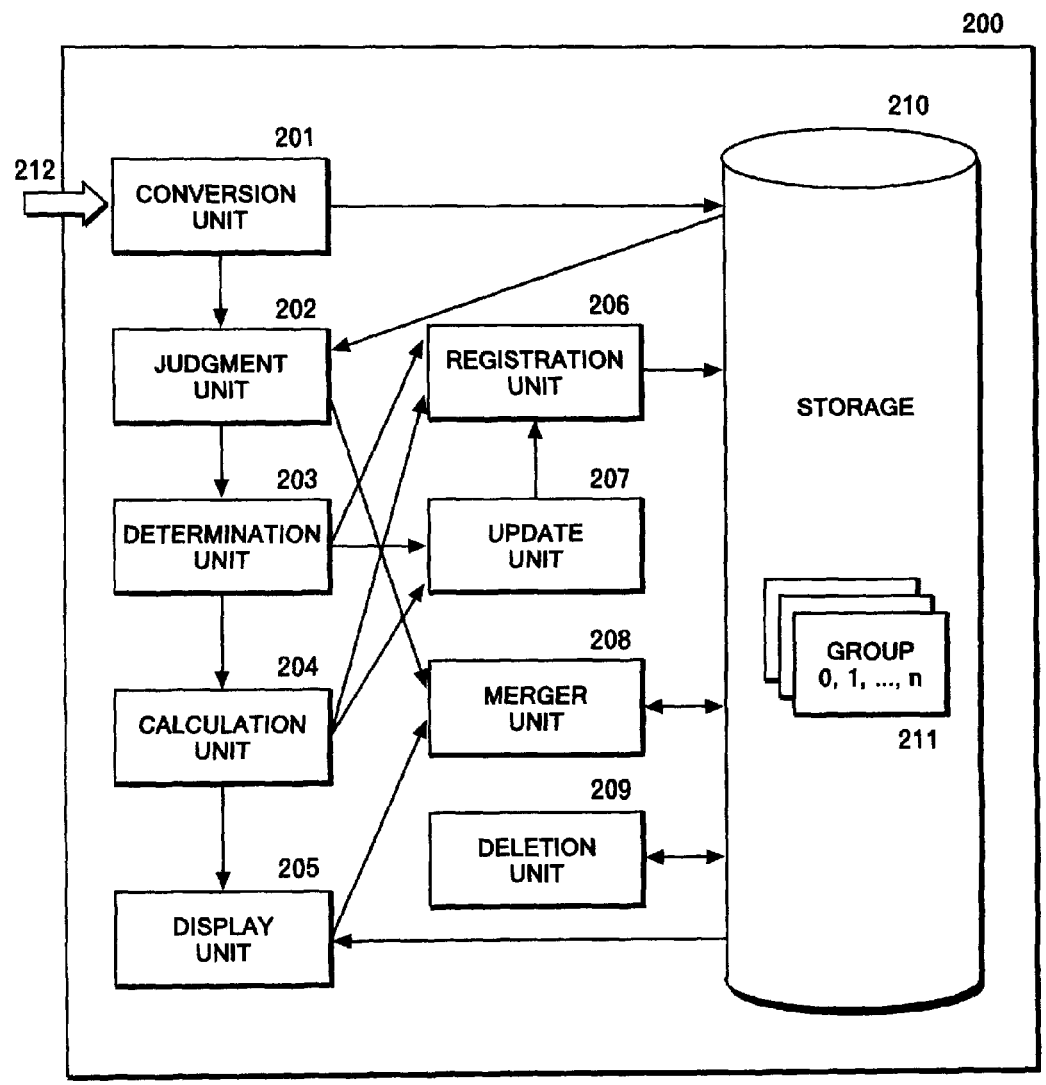
FIG. 2 shows an example of a system configuration diagram in an embodiment of the present invention.

FIG. 2 shows an example of a system configuration diagram of an embodiment of the present invention.

A computer system 200 includes a conversion unit 201, a judgment unit 202, a determination unit 203, a calculation unit 204, a display unit 205, a registration unit 206, an update unit 207, a merger unit 208, a deletion unit 209 and a storage 210. The storage 210 may be provided inside or outside the computer system 200. Moreover, the storage 210 may be a storage device in a network connected to the computer system 200 or a storage device in a different computer system. The storage 210 stores groups 0 to n 211.

A user provides, as input information 212 to the computer system 200, a program and the execution frequencies of respective analysis-target algorithms included in the program. The input information 212 may be stored in the storage 210 in advance.

The conversion unit 201 converts, into a directed graph, each of the analysis-target algorithms in the program provided as the input information 212. Here, a computer for performing this conversion may be different from one for performing the subsequent processing. In such a case, the directed graph obtained by the conversion is stored in the storage 210.

The judgment unit 202 acquires the directed graph from the conversion unit 201. If the directed graph is stored in the storage 210, the judgment unit 202 acquires the directed graph from the storage 210. The judgment unit 202 also acquires one of the groups 211 from the storage 210. The judgment unit 202 judges whether the converted directed graph is similar to a representative directed graph included in the group 211. This judgment is repeated until a group 211 including a representative directed graph that is similar to the converted directed graph is found, or until the similarity judgment is completed for all the groups 211.

The determination unit 203 acquires the judgment results from the judgment unit 202. The determination unit 203 determines a group to which the converted directed graph belongs, among the groups 211 stored in the storage 210.

On the basis of the execution frequency of the determined group 211 and the execution frequency of the converted directed graph, the calculation unit 204 calculates the execution frequency of the group 211. For example, the calculation unit 204 adds the execution frequency of the algorithm provided as input information 212 and corresponding to the directed graph, to the execution frequency of the determined group 211 to which the directed graph belongs.

The update unit 207 updates the representative directed graph of the group 211 to which the similar representative directed graph belongs, by using, as a new representative directed graph, the directed graph having the smallest number of nodes between the converted directed graph and the similar representative directed graph. The registration unit 206 registers the updated group 211 to which the determined directed graph belongs, in the storage 210. Here, the registration unit 206 may add the converted directed graph to the group to which the determined directed graph belongs.

If there is found no group 211 including a representative directed graph that is similar to the directed graph, among the groups 211 in the judgment, the registration unit 206 stores, in the storage 210, the converted directed graph as a representative directed graph of a new group. Moreover, the registration unit 206 stores, in the storage 210, the execution frequency of the directed graph as the execution frequency of the new group.

The display unit 205 acquires the groups 211 from the storage 210. In one embodiment of the present invention, the display unit 205 displays the algorithms corresponding respectively to the representative directed graphs and the execution frequencies of the groups to which the representative directed graph belong. The display unit 205 may display the algorithms of the respective representative directed graphs on a group-by-group basis in the order of their execution frequencies, for example, in descending order of their execution frequencies. Moreover, the display unit 205 may display identifiers corresponding respectively to the representative directed graphs of the groups 211.

In another embodiment of the present invention, the display unit 205 displays the representative directed graph included in each of the groups 211 and the execution frequency of the group 211. This display may be performed for all the groups 211 or for the groups 211 that are arbitrarily selected by a user or the computer system. Moreover, if each of the groups 211 includes all the graphs belonging to the group, all the graphs may be displayed. Further, the display 205 may convert, into an algorithm, each representative directed graph and all the graphs belonging to the group, and display the algorithm.

The merger unit 208 acquires the groups 211 from the storage 210, and merges the groups 211 that are similar to each other. This merger is performed, for example, before the display unit 205 performs the display or when the number of the groups 211 has reached a predetermined upper limit N (N is an integer).

The deletion unit 209 deletes a group that has low execution frequency, from the storage 210. This deletion is performed, for example, when the number of groups 211 has reached the predetermined upper limit N.

Figure 3A:
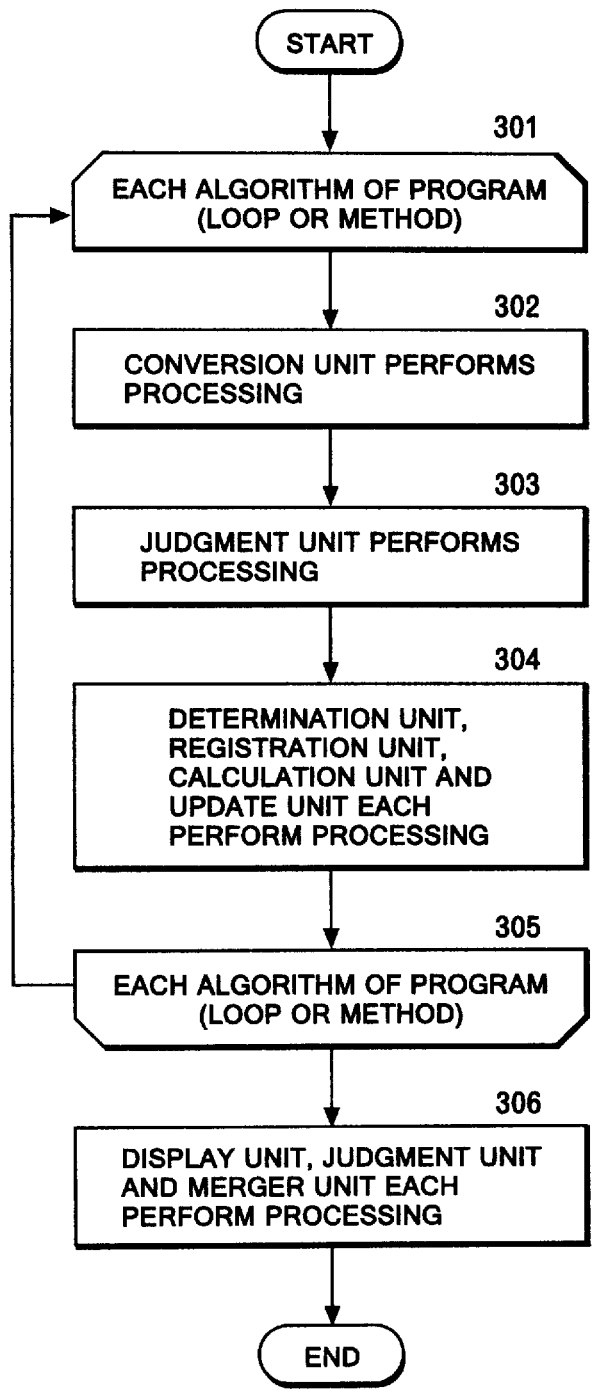
FIG. 3A shows an example of a flowchart for assisting in analyzing a program, in an embodiment of the present invention.

FIG. 3A shows an example of a flowchart for assisting in analyzing a program, according to an embodiment of the present invention.

Step 301 is the start of a loop process. In Step 301, a computer system acquires a program as input information from storage. The program includes one or multiple algorithms. The algorithm includes one or multiple loops or methods. The computer system also receives the execution frequency of the algorithm. If the program includes multiple algorithms, the computer system receives an execution frequency for each of the algorithms.

The computer system may receive the type of each node included in a directed graph obtained by converting the algorithm, as optional input information. The node types depend on the type of the used directed graph. For example, if the type of the used directed graph is a CFG or an AST, the node types are load, store and synchronize, for example. Alternatively, instead of node types, the computer system may receive a reserved word, generally used in program code, or an identifier. In the latter case, a user prepares in advance a correspondence table including a correspondence relationship between each of the nodes and a reserved word or an identifier. The computer system can convert the reserved word or the identifier into a node type by referring to the table.

Upon acquisition of the input information, the computer system performs Steps 302 to 304 on each of all analysis-target algorithms included in the program.

In the following, description is given by taking, as an example, a case in which each analysis-target algorithm included in the program corresponds to a loop structure in a method included in the program. If no loop structure is included in the method, the method itself corresponds to the analysis-target algorithm included in the program.

In Step 302, a conversion unit converts the loop structure in the method into a directed graph (called a graph T below). The graph T is a graph obtained by converting an algorithm according to a CFG or an AST, for example. If no loop structure is included in the method, the conversion unit converts the method, not including any loop structure, into the graph T. A method of converting a method including a loop structure into the graph T and a method of converting a method not including any loop structure into the graph T are described later.

If node types are provided to the computer system as input information, the conversion unit judges whether to convert, into the graph T, a corresponding one of the method including a loop structure and the method not including any loop structure. If the method including a loop structure or the method not including any loop structure does not include any target to be converted to a node designated by any of the node types, the conversion unit does not convert the corresponding method into the graph T. Moreover, if the graph T does not include any nodes designated by the node types, the conversion unit may delete the graph T.

In Step 303, a judgment unit uses, in two ways, a topological embedding algorithm (TEA, below) to be described later, for a representative directed graph (graph P, below) belonging to each of the groups in the group table and the graph T. Here, implementing in two ways means that the judgment unit implements the TEA both by designating the graph P as a first argument of the TEA while designating the graph T as a second argument of the TEA ({P,T} below) and by designating the graph T as the first argument while designating the graph P as the second argument ({T,P} below).

The TEA is an algorithm for obtaining, for the two graphs set as the arguments, relationships between nodes respectively included in the two graphs. The TEA receives a first parameter and a second parameter as the arguments. Then, a directed graph is set for each of the first parameter and the second parameter. The TEA judges whether the directed graph set for the first parameter is embeddable in the second parameter. Here, being embeddable means that the directed graph set for the second parameter includes all the nodes included in the directed graph set for the first parameter and also includes, between all the nodes, paths that are the same as those included in the directed graph set for the first parameter.

For details of the TEA, see James Jianghai Fu, "Directed Graph Pattern Matching and Topological Embedding," Journal of Algorithms, Vol. 22, pp. 372-391, 1997.

The judgment unit may obtain similarity on the basis of the relationships between the nodes, the relationships obtained by using the TEA. Here, the nodes do not always have one-to-one relationships. If a node corresponds to multiple nodes, the judgment unit obtains similarity on the basis of the number of nodes that are included in both of the two graphs and the number of nodes that are included in one of the two graphs. The judgment unit may change determination obtained by using the TEA that the directed graph is embeddable, to determination that the directed graph is not embeddable, if the similarity is smaller than a threshold.

In Step 304, firstly, a determination unit determines a group to which the graph T belongs, on the basis of the result obtained by using the TEA. Then, a registration unit, a calculation unit and an update unit update the group table.

If it is determined that the graph P is embeddable in the graph T as a result of applying the pair of {P,T} to the TEA, the calculation unit adds the execution frequency of the graph T included in the input information to the execution frequency of the group to which the graph P belongs. Then, the registration unit registers the resultant execution frequency, in the group to which the graph P belongs. Here, the registration unit may register the graph T in optional elements (all_graphs) of the group to which the graph P belongs.

If it is judged that the graph P is not embeddable in the graph T as a result of applying the pair of {P,T} to the TEA and it is judged that the graph T is embeddable in the graph P as a result of applying the pair of {T,P} to the TEA, the update unit updates the group by substituting the graph T for the graph P of the group to which the graph P belongs. Moreover, the calculation unit adds the execution frequency of the graph T included in the input information to the execution frequency of the group to which the graph P belongs. Then, the registration unit registers the resultant execution frequency, for the group to which the graph P belongs. Here, the registration unit may register the graph T in the optional elements (all_graphs) of the graph to which the graph P belongs.

If it is judged that the graph P is not embeddable in the graph T as a result of applying the pair of {P,T} to the TEA and it is judged that the graph T is not embeddable in the graph P as a result of applying the pair of {T,P} to the TEA, the registration unit adds, to the group table, the graph T and the execution frequency of the graph T as a new group.

Step 305 is the end of the loop process starting from Step 301.

In Step 306, a display unit performs the following output processing upon completion of the program analysis or in response to some event. The event may be an input made by a user by using a keyboard or a mouse, for example.

In the output processing, the judgment unit performs similarity judgment on the representative directed graphs belonging respectively to the groups registered in the group table. The similarity judgment may be the same judgment as that in Step 303. If it is judged that representative directed graphs are similar, the merger unit merges the groups to which the representative directed graphs determined to be similar (called similar groups, below) belong. Here, the representative directed graph having the smallest number of nodes among the representative directed graphs belonging to the similar groups serves as the representative directed graph of the group obtained by the merger. Moreover, the total value of the execution frequencies of all the directed graphs belonging to the similar groups serves as the execution frequency of all the directed graphs belonging to the group obtained by the merger. Furthermore, all the directed graphs belonging to the similar groups serve as the directed graphs belonging to the group obtained by the merger.

The display unit sorts the groups included in the group table on the basis of the execution frequencies of the respective groups. Then, the display unit displays elements belonging to the groups in descending order of the execution frequencies of the groups.

Figure 3B:
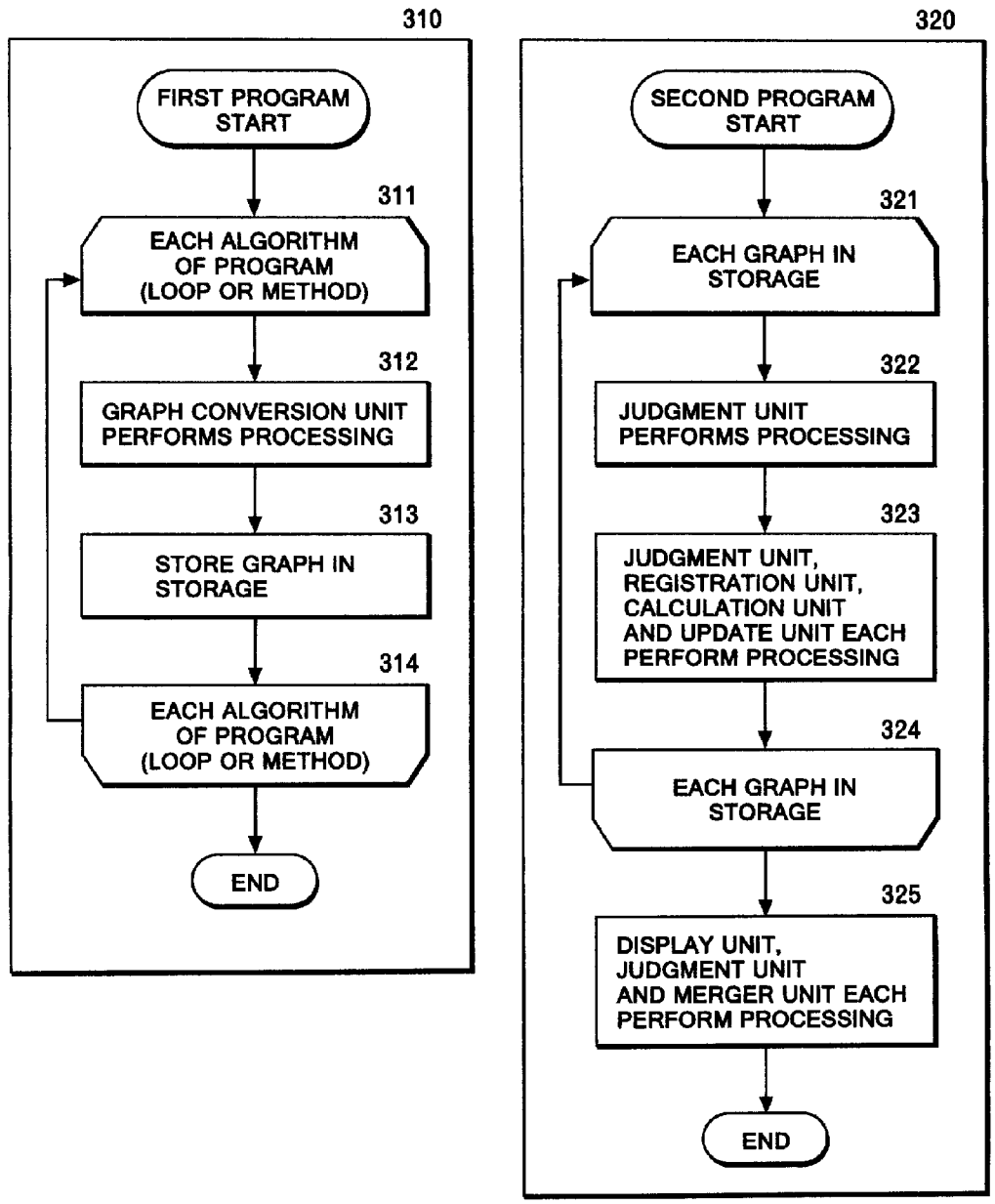
FIG. 3B shows an example of a flowchart in the case of performing analysis processing in divided processes, in an embodiment of the present invention.

FIG. 3B shows an example of flowcharts in the case of performing analysis processing in divided processes, according to an embodiment of the present invention.

In this embodiment of the present invention, an analysis program executed by a computer system may be divided into a program for conversion to a graph T (a first program, below) and a program for similarity judgment and display of groups (a second program, below). The divided programs may be set to be executed by different computers.

A flowchart 310 is a flowchart for performing a program analysis by using the first program.

Step 311 is the start of a loop process.

In Step 311, the computer system receives a program, and the execution frequencies of analysis-target algorithms included in the program, as input information for the first program.

Upon acquisition of the input information, the computer system performs Steps 312 and 313 on all the analysis-target algorithms included in the program.

In the following, description is given by taking, as an example, a case in which each analysis-target algorithm included in the program corresponds to a loop structure in a method included in the program. If no loop structure is included in the method, the method itself corresponds to the analysis-target algorithm included in the program.

In Step 312, a conversion unit converts a loop structure included in the method into a directed graph (called a graph T below). The graph T is a graph obtained by converting an algorithm according to a CFG or an AST, for example. If no loop structure is included in the method, the conversion unit converts the method, not including any loop structure, into the graph T. A method of converting a method including a loop structure into the graph T and a method of converting a method not including any loop structure into the graph T is described later.

If node types are provided to the computer system as input information, the conversion unit judges whether to convert, into the graph T, a corresponding one of the method including a loop structure and the method not including any loop structure. If the method including a loop structure or the method not including any loop structure does not include any target to be converted into a node designated by any of the node types, the conversion unit does not convert the corresponding method into the graph T. Moreover, if the graph T does not include any nodes designated by the node types, the conversion unit may delete the graph T.

In Step 313, a registration unit registers the graph T and the execution frequency corresponding to the graph T in storage.

Step 314 is the end of the loop process starting from Step 311.

When Steps 312 and 313 are performed on all the analysis-target algorithms included in the program, the computer system terminates the first program. A display unit may output the graph T onto, for example, a monitor or a paper medium before the termination.

A flowchart 320 is a flowchart for performing a program analysis by using the second program.

Step 321 is the start of a loop process.

In Step 321, a computer system may receive node types required to be included in the graph T, as input information. The node types depend on the type of the graph T. For example, if the type of the used directed graph is a CFG or an AST, the node types are load, store and synchronize, for example. Alternatively, instead of node types, the computer system may receive a reserved word or an operator, generally used in program code. In the latter case, a user prepares in advance a correspondence table including a correspondence relationship between each of the nodes and a reserved word or an operator. The computer system can convert the reserved word or the operator into a node type by referring to the table.

The computer system acquires, from a storage, the graph T registered by the first program and the execution frequency corresponding to the graph T, as input information for the second program.

The computer system performs Steps 322 and 323 on the acquired graph T. Here, the computer system does not perform Steps 322 and 323 on the graph T not including the node types designated by the input option.

In Step 322, a judgment unit uses a TEA in two ways, for a representative directed graph (graph P) of each of the groups included in a group table and the graph T.

In Step 323, firstly, a determination unit determines a group to which the graph T belongs, on the basis of the result obtained by using the TEA. Then, a registration unit, a calculation unit and an update unit updates the group table.

If it is determined that the graph P is embeddable in the graph T as a result of applying the pair of {P,T} to the TEA, the calculation unit adds the execution frequency corresponding to the graph T acquired from the storage, to the execution frequency of the group to which the graph P belongs. Then, the registration unit registers the resultant execution frequency, in the group to which the graph P belongs. Here, the registration unit may register the graph T in optional elements (all_graphs) of the group to which the graph P belongs.

If it is judged that the graph P is not embeddable in the graph T as a result of applying the pair of {P,T} to the TEA and it is judged that the graph T is embeddable in the graph P as a result of applying the pair of {T,P} to the TEA, the update unit updates the group by substituting the graph T for the graph P of the group to which the graph P belongs. Moreover, the calculation unit adds the execution frequency corresponding to the graph T obtained from the storage, to the execution frequency of the group to which the graph P belongs. Then, the registration unit registers the resultant execution frequency, in the group to which the graph P belongs. Here, the registration unit may register the graph T in the optional elements (all_graphs) of the graph to which the graph P belongs.

If it is judged that the graph P is not embeddable in the graph T as a result of applying the pair of {P,T} to the TEA and it is judged that the graph T is not embeddable in the graph P as a result of applying the pair of {T,P} to the TEA, the registration unit adds, to the group table, the graph T and the execution frequency corresponding to the graph T as a new group.

Step 324 is the end of the loop process starting from Step 321.

In Step 325, a display unit performs the following output processing upon completion of the program analysis or in response to some event. The event may be an input made by a user by using a keyboard or a mouse, for example.

In the output processing, the judgment unit performs similarity judgment on the representative directed graphs belonging respectively to the groups registered in the group table. The similarity judgment may be the same judgment as that in Step 322. If it is judged that representative directed graphs are similar, the merger unit merges the groups to which the representative directed graphs determined to be similar (called similar groups, below) belong. Here, the representative directed graph having the smallest number of node among the representative directed graphs belonging to the similar groups serves as the representative directed graph of the group obtained by the merger. Moreover, the total value of the execution frequencies of all the directed graphs belonging to the similar groups serves as the execution frequency of all the directed graphs belonging to the group obtained by the merger. Furthermore, all the directed graphs belonging to the similar groups serve as the directed graphs belonging to the group obtained by the merger.

The display unit sorts the groups included in the group table on the basis of the execution frequencies of the respective groups. Then, the display unit displays elements belonging to the groups in descending order of the execution frequencies of the groups.

FIG. 4A shows an example of a program, which is input information, in an embodiment of the present invention.

A program 400, which is input information, includes a method 1 401, a method 2 402, a method 3 403 and a method 4 404.

The method 1 401 includes a loop 1 411, and the execution frequency of the loop 1 411 is 20. The method 2 402 includes a loop 2 412, and the execution frequency of the loop 2 412 is 25. The method 3 403 includes a loop 3 413, and the execution frequency of the loop 3 413 is 20. The method 4 404 includes a loop 4 414, and the execution frequency of the loop 4 414 is 5. Thus, the loops 1 to 4 411 to 414 are not identical loops.

A computer system converts the loops 1 to 4, 411 to 414, included in the methods 1 to 4 401 to 404, into directed graphs. In the following example, the computer system converts each of the loops 1 to 4, 411 to 414, into graphs corresponding to two kinds of directed graphs, an AST and a CFG. It is to be noted that, in this embodiment of the present invention, conversion only to a CFG is also possible.

An AST is a directed tree structure. In the AST, an operator corresponds to a vertex of the tree structure, and an operand of the operator corresponds to a leaf of the tree structure. If the AST is a directed graph, each of the vertex and the leaf is a node. An edge is from the vertex to the leaf.

A CFG represents all paths that can be passed in program execution, in the form of a graph. In the CFG, a set of processes not including any branch is set as a node. Moreover, in the CFG, the start, which is the entrance to the entire graph, and the end, which is the exit from the entire graph, are each set as a node. Transition from the set of processes to the next set of processes corresponds to an edge.

A procedure for converting each of the loops 1 to 4 411 to 414 to an AST graph is described below.

The computer system investigates each line of each of the loops 1 to 4 411 to 414. In this investigation, the computer system extracts each operator and an operand of the operator. For example, the computer system extracts an operation included in the line targeted for the investigation. Here, an operation is, for example, loading data from a memory, storing data to the memory, calculation such as addition or subtraction, assigning a value to a variable, or determination on an if sentence or a for sentence. The computer system, for example, stores a reserved word of a programming language corresponding to the operation, in storage. When finding the reserved word thus stored in the investigation, the computer system sets, to be a node for the AST, the reserved word thus found and the operand of the reserved word. Moreover, the computer system draws an edge from the node corresponding to the reserved word to the node corresponding to the operand of the reserved word.

A procedure for converting each of the loops 1 to 4 411 to 414 into a CFG is described below.

In this example, a node corresponding to each vertex of the AST is used as a node of the CFG. The computer system investigates the loops 1 to 4 411 to 414 for each line in the order of execution. If the loops 1 to 4 411 to 414 include branches, the computer system investigates the branches in the order of execution. When finding a part converted into a node corresponding to a vertex of the AST in the investigation, the computer system sets the part to be a node. Moreover, the computer system draws an edge between nodes in the order in which the nodes are found. Furthermore, the computer system draws an edge from the start node of each loop to the node which is found first in the loop, and also draws an edge from a node corresponding to a process which is the exit from the loop, i.e., a process executed lastly in the loop, to be the end node.

In another procedure for conversion, the computer system investigates the loops 1 to 4 411 to 414 for each line in the order of execution. If the loops include branches, the computer system investigates the branches in the order of execution. In the investigation, the computer system extracts a set of processes. The computer system extracts, for example, each reserved word of a programming language included in the line targeted for investigation. The computer system stores, for example, the association between the reserved word and the set of processes, in the storage. When finding an associated reserved word in the investigation, the computer system sets the reserved word thus found to be a node of the CFG. Moreover, the computer system draws an edge between nodes in the order in which the nodes are found. Furthermore, the computer system draws an edge from the start node of each loop to the node which is found first in the loop, and also sets a node from the node corresponding to a set of processes which is the exit from the loop, i.e., a set of processes executed lastly in the loop, to the end node.

Figure 4B:
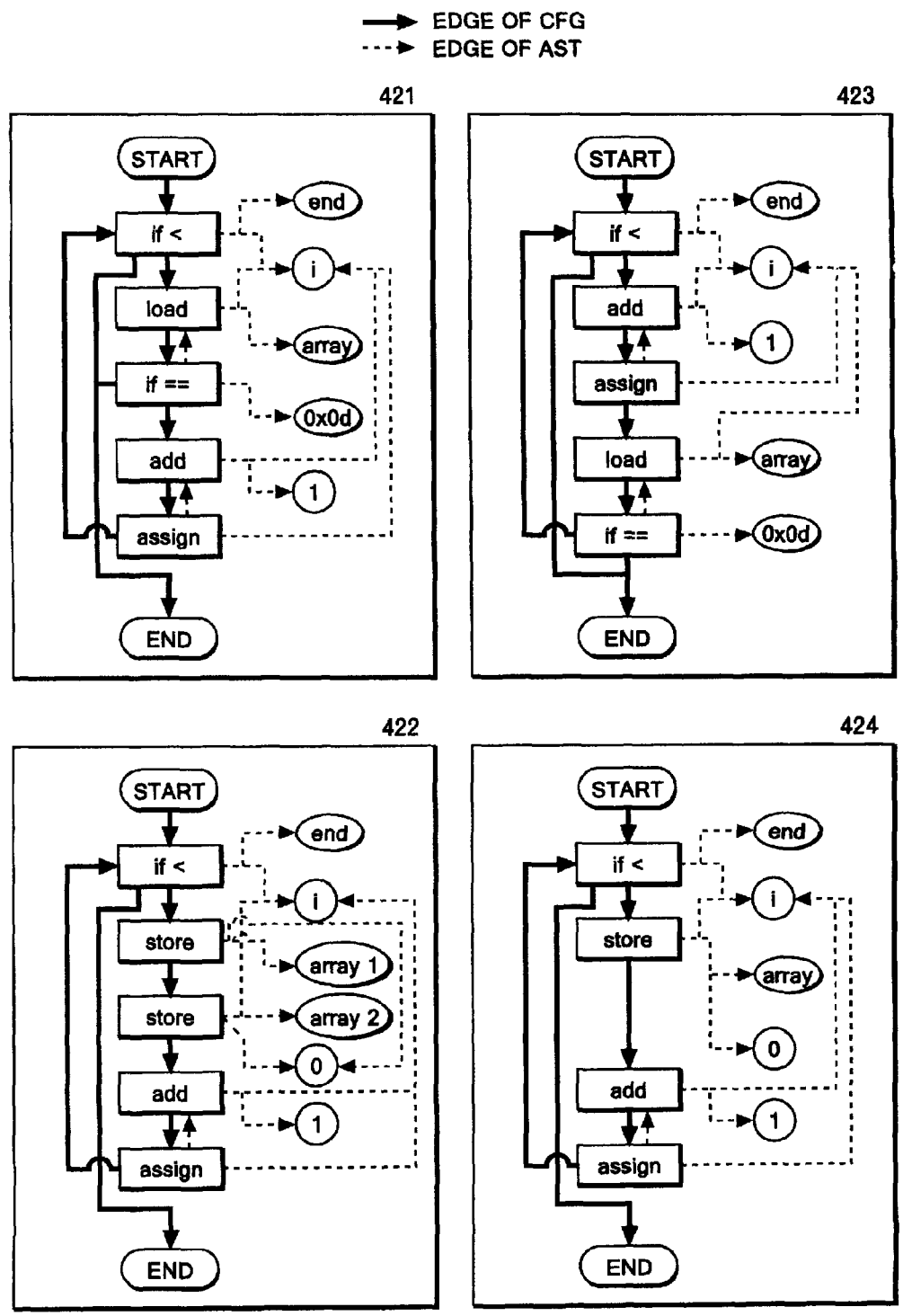
FIG. 4B shows examples of a directed graph obtained by converting a loop, in an embodiment of the present invention.

FIG. 4B shows an example in which each loop is converted into a directed graph, in this embodiment of the present invention.

Directed graphs 1 to 4, 421 to 424, are directed graphs obtained respectively by converting the loops 1 to 4 (411 to 414 in FIG. 4A) in the above-described procedures. In addition, the directed graphs 1 to 4 421 to 424 are graphs corresponding to two kinds of directed graphs, the AST and the CFG. In each of the directed graphs 1 to 4 421 to 424, each node representing an operator in the AST and each node of the CFG are represented by nodes surrounded by squares. Each node representing an operand of an operator in the AST is represented by a node surrounded by a circle. Each edge of the AST is represented by an arrow of a broken line. Each edge of the CFG is represented by an arrow of a solid line.

A procedure for converting the loops 1 to 4 411 to 414 respectively into the directed graphs 1 to 4 421 to 424 is described.

Firstly, description is given of a flow of converting each of the loops 1 to 4 411 to 414 to an AST graph.

The code in the first line of the loop 1 411 includes an operation for judging whether a right operand is larger. Targets for the operation for judging whether the right operand is larger are i and end. Accordingly, the computer system sets the operation for judging the right operand is larger ("if<") to be a node corresponding to a vertex. Moreover, the computer system sets, to be a node corresponding to a leaf, each of i and end, which are the targets of the operation for judging whether the right operand is larger. Furthermore, the computer system draws an edge from the node representing "if<" to each of the node representing i and the node representing end.

The code in the second line of the loop 1 411 includes a load operation ("load"), which is an operation for loading an $i^{th}$ element of an array from the memory. Accordingly, the computer system sets the load operation to be a node corresponding to a vertex. Moreover, the computer system sets, to be a node corresponding to a leaf, each of the array and i, which are the targets of the load operation. Furthermore, the computer system draws an edge from the node representing "load" to each of the node representing i and the node representing the array. Here, the code in the second line of the loop 1 411 further includes an operation for judging whether the left and right operands are equal. Targets of the operation for judging whether the left and right operands are equal are the result of the load operation and the constant 0x0d. Accordingly, the computer system sets, to be a node corresponding to a vertex, the operation for judging whether the left and right operands are equal ("if=="). Moreover, the computer system sets, to be a node corresponding to a leaf, each of the result of the load operation and the constant 0x0d, which are the targets of the operation for judging whether the left and right operands are equal. Furthermore, the computer system draws an edge from the node representing "if==" to each of the node representing "load" for the load operation and the node representing the 0x0d.

The code in the third line of the loop 1 411 includes an add operation, which is an operation for adding 1 to i. Accordingly, the computer system sets the add operation ("add") to be a node corresponding to a vertex. Moreover, the computer system sets, to be a node corresponding to a leaf, each of i and the constant 1, which are targets of the add operation. Furthermore, the computer system draws an edge from the node representing "add" to each of the node representing i and the node representing 1. Here, the code in the third line of the loop 1 411 further includes an assign operation, which is an operation for assigning the result of the add operation to i. Targets of the assign operation are the result of the add operation and i. Accordingly, the computer system sets the assign operation ("assign") to be a node corresponding to a vertex. Moreover, the computer system sets, to be a node corresponding to a leaf, each of the result of the add operation and i, which are the targets of the assign operation. Furthermore, the computer system draws an edge from the node representing "assign" to each of the node representing "add" for the add operation and the node representing i.

The code in the first line of the loop 2 412 includes an operation for judging whether a right operand is larger. Targets of the operation for judging whether the right operand is larger are i and end. Accordingly, the computer system sets the operation for judging the right operand is larger ("if<") to be a node corresponding to a vertex. Moreover, the computer system sets, to be a node corresponding to a leaf, each of i and end, which are the targets of the operation for judging whether the right operand is larger. Furthermore, the computer system draws an edge from the node representing "if<" to each of the node representing i and the node representing end. Here, the code in the first line of the loop 2 412 further includes an add operation, which is an operation for adding 1 to i. Accordingly, the computer system sets the add operation ("add") to be a node corresponding to a vertex. Moreover, the computer system sets, to be a node corresponding to a leaf, each of i and the constant 1, which are targets of the add operation. Furthermore, the computer system draws an edge from the node representing "add" to each of the node representing i and the node representing 1. Here, the code in the first line of the loop 2 412 further includes an assign operation, which is an operation for assigning the result of the add operation to i. Targets of the assignment operation are the result of the add operation and i. Accordingly, the computer system sets the assignment operation ("assign") to be a node corresponding to a vertex. Moreover, the computer system sets, to be a node corresponding to a leaf, each of the result of the add operation and i, which are the targets of the assign operation. Furthermore, the computer system draws an edge from the node representing "assign" to each of the node representing "add" for the add operation and the node representing i.

The code in the second line of the loop 2 412 includes a store operation, which is an operation for storing the constant 0 in an $i^{th}$ element of an array 1. Accordingly, the computer system sets the store operation (first "store") to be a node corresponding to a vertex. Moreover, the computer system sets, to be a node corresponding to a leaf, each of the array 1, i and the constant 0, which are the targets of the store operation. Furthermore, the computer system draws an edge from the node representing the first "store" to each of the node representing the array 1, the node representing i and the node representing the constant 0.

The code in the third line of the loop 2 412 includes a store operation, which is an operation for storing the constant 0 in an i-th element of an array 2. Accordingly, the computer system sets the store operation (second "store") to be a node corresponding to a vertex. Moreover, the computer system sets, to be a node corresponding to a leaf, each of the array 2, i and the constant 0, which are the targets of the store operation. Furthermore, the computer system draws an edge from the node representing the second "store" to each of the node representing the array 2, the node representing i and the node representing the constant 0.

The code in the first line of the loop 3 413 includes an operation for judging whether a right operand is larger. Targets of the operation for judging whether the right operand is larger are i and end. Accordingly, the computer system sets the operation for judging the right operand is larger ("if<") to be a node corresponding to a vertex. Moreover, the computer system sets, to be a node corresponding to a leaf, each of i and end, which are the targets of the operation for judging whether the right operand is larger. Furthermore, the computer system draws an edge from the node representing "if<" to each of the node representing i and the node representing end.

The code in the second line of the loop 3 413 includes an add operation, which is an operation for adding 1 to i. Accordingly, the computer system sets the addition operation ("add") to be a node corresponding to a vertex. Moreover, the computer system sets, to be a node corresponding to a leaf, each of i and the constant 1, which are targets of the add operation. Furthermore, the computer system draws an edge from the node representing "add" to each of the node representing i and the node representing 1. Here, the code in the second line of the loop 3 413 further includes an assign operation, which is an operation for assigning the result of the add operation to i. Targets of the assign operation are the result of the addition operation and i. Accordingly, the computer system sets the assign operation ("assign") to be a node corresponding to a vertex. Moreover, the computer system sets, to be a node corresponding to a leaf, each of the result of the add operation and i, which are the targets of the assign operation. Furthermore, the computer system draws an edge from the node representing "assign" to each of the node representing "add" for the add operation and the node representing i.

The code in the third line of the loop 3 413 includes a load operation, which is an operation for loading an i-th element of an array from the memory. Accordingly, the computer system sets the load operation ("load") to be a node corresponding to a vertex. Moreover, the computer system sets, to be a node corresponding to a leaf, each of the array and i, which are the targets of the load operation. Furthermore, the computer system draws an edge from the node representing "load" to each of the node representing i and the node representing the array. Here, the code in the third line of the loop 3 413 further includes an operation for judging whether the left and right operands are equal. Targets of the operation for judging whether the left and right operands are equal are the result of the load operation and a constant 0x0d. Accordingly, the computer system sets, to be a node corresponding to a vertex, the operation for judging whether the left and right operands are equal ("if=="). Moreover, the computer system sets, to be a node corresponding to a leaf, each of the result of the load operation and the constant 0x0d, which are the targets of the operation for judging whether the left and right operands are equal. Furthermore, the computer system draws an edge from the node representing "if==" to each of the node representing "load" for the load operation and the node representing the 0x0d.

The code in the first line of the loop 4 414 includes an operation for judging whether a right operand is larger. Targets of the operation for judging whether the right operand is larger are i and end. Accordingly, the computer system sets the operation for judging the right operand is larger ("if<") to be a node corresponding to a vertex. Moreover, the computer system sets, to be a node corresponding to a leaf, each of i and end, which are the targets of the operation for judging whether the right operand is larger. Furthermore, the computer system draws an edge from the node representing "if<" to each of the node representing i and the node representing end. Here, the code in the first line of the loop 4 414 includes an add operation, which is an operation for adding 1 to i. Accordingly, the computer system sets the add operation ("add") to be a node corresponding to a vertex. Moreover, the computer system sets, to be a node corresponding to a leaf, each of i and the constant 1, which are targets of the add operation. Furthermore, the computer system draws an edge from the node representing "add" to each of the node representing i and the node representing 1. Here, the code in the first line of the loop 4 414 further includes an assign operation, which is an operation for assigning the result of the add operation to i. Targets of the assign operation are the result of the add operation and i. Accordingly, the computer system sets the assign operation ("assign") to be a node corresponding to a vertex. Moreover, the computer system sets, to be a node corresponding to a leaf, each of the result of the add operation and i, which are the targets of the assign operation. Furthermore, the computer system draws an edge from the node representing "assign" to each of the node representing "add" for the add operation and the node representing i.

The code in the second line of the loop 4 414 includes a store operation, which is an operation for storing the constant 0 in an $i^{th}$ element of an array. Accordingly, the computer system sets the store operation ("store") to be a node corresponding to a vertex. Moreover, the computer system sets, to be a node corresponding to a leaf, each of the array, i and the constant 0, which are the targets of the store operation. Furthermore, the computer system draws an edge from the node representing "store" to each of the node representing the array, the node representing i and the node representing the constant 0.

Next, a procedure for converting each of the loops 1 to 4 411 to 414 is converted into a CFG is described. Here, each CFG node is the same as a node corresponding to a vertex of the corresponding AST.

In the loop 1 411, "if<" is executed first. Accordingly, the computer system draws an edge from the start node to the node representing "if<." If the result of "if<" is false, the loop is terminated. Hence, the computer system draws an edge from the node representing "if<" to the end node.

If the result of "if<" is true, "load" is executed. Accordingly, the computer system draws an edge from the node representing "if<" to the node representing "load." Then, "if==" is executed. Accordingly, the computer system draws an edge from the node representing "load" to the node representing "if==." If the result of "if==" is true, a return instruction, indicating termination of the method, is executed, and hence the loop is terminated. Accordingly, the computer system draws an edge from the node representing "if==" to the end node.

If the result of "if==" is false, "add" is executed. Accordingly, the computer system draws an edge from the node representing "if==" to the node representing "add." Then, "assign" is executed. Accordingly, the computer system draws an edge from the node representing "add" to the node representing "assign."

After the execution of "assign," the process returns to the start of the loop. Accordingly, the computer system draws an edge from the node representing "assign" to the node representing "if<."

In the loop 2 412, "if<" is executed first. Accordingly, the computer system draws an edge from the start node to the node representing "if<." If the result of "if<" is false, the loop is terminated. Accordingly, the computer system draws an edge from the node representing "if<" to the end node.

If the result of "if<" is true, the first "store" is executed. Accordingly, the computer system draws an edge from the node representing "if<" to the node representing the first "store." Then, the second "store" is executed. Accordingly, the computer system draws an edge from the node representing the first "store" to the node representing the second "store." Then, "add" is executed. Accordingly, the computer system draws an edge from the node representing the second "store" to the node representing "add." Then, "assign" is executed. Accordingly, the computer system draws an edge from the node representing "add" to the node representing "assign."

After the execution of "assign," the process returns to the start of the loop. Accordingly, the computer system draws an edge from the node representing "assign" to the node representing "if<."

In the loop 3 413, "if<" is executed first. Accordingly, the computer system draws an edge from the start node to the node representing "if<." If the result of "if<" is false, the loop is terminated. Accordingly, the computer system draws an edge from the node representing "if<" to the end node.

If the result of "if<" is true, "add" is executed. Accordingly, the computer system draws an edge from the node representing "if<" to the node representing "add." Then, "assign" is executed. Accordingly, the computer system draws an edge from the node representing "add" to the node representing "assign." Then, "load" is executed. Accordingly, the computer system draws an edge from the node representing "assign" to the node representing "load." Then, "if==" is executed. Accordingly, the computer system draws an edge from the node representing "load" to the node representing "if==." If the result of "if==" is true, a return instruction, indicating termination of the method, is executed, and hence the loop is terminated. Accordingly, the computer system draws an edge from the node representing "if==" to the end node.

If the result of "if==" is false, the process returns to the start of the loop. Accordingly, the computer system draws an edge from the node representing "if==" to the node representing "if<."

In the loop 4 414, "if<" is executed first. Accordingly, the computer system draws an edge from the start node to the node representing "if<." Here, if the result of "if<" is false, the loop is terminated. Accordingly, the computer system draws an edge from the node representing "if<" to the end node.

If the result of "if<" is true, "store" is executed. Accordingly, the computer system draws an edge from the node representing "if<" to the node representing "store." Then, "add" is executed. Accordingly, the computer system draws an edge from the node representing "store" to the node representing "add." Then, "assign" is executed. Accordingly, the computer system draws an edge from the node representing "add" to the node representing "assign."

After the execution of "assign," the process returns to the start of the loop. Accordingly, the computer system draws an edge from the node representing "assign" to the node representing "if<."

Through the above-described procedure the loop 1 to 4 411 to 414 are converted respectively to the directed graphs 1 to 4 421 to 424.

In the following, an embodiment of the present invention is concretely described by taking, as an example, a case in which the program (400 in FIG. 4A) of the input information is an input. Here, it is assumed that "all graphs belonging to a group (belonging graphs, below)," which are optional elements of a group table, are also registered in the group table.

Firstly, a computer system converts each of loops 1 to 4 411 to 414 included in the program 400 of the input information into a graph representation. Here, the computer system represents each of the loops 1 to 4 411 to 414 in the form of a graph corresponding to two kinds of directed graphs, the AST and the CFG. By the conversion, directed graphs 1 to 4 421 to 424 are created.

Then, for each of the directed graphs 1 to 4 421 to 424 in this order, the computer system judges whether the directed graph is similar to a representative directed graph of each group. In accordance with the judgment results, the computer system registers corresponding ones of the directed graphs 1 to 4 421 to 424 in the group table. For the judgments, a TEA is used. Here, the directed graphs 1 to 4 421 to 424 each include two kinds of edges, AST edges and CFG edges. The computer system uses the TEA for each of a directed graph in the case of using only AST edges and a directed graph in the case of using only CFG edges. For each of the directed graphs 1 to 4, the computer system judges that the directed graph is similar to the corresponding representative directed graph, only when the directed graph in the case of using only AST edges is determined to be similar to the representative directed graph in the case of using only AST edges or only when the directed graph in the case of using only CFG edges is determined to be similar to the representative directed graph in the case of using only CFG edges.

A detailed procedure for the judgments and the registrations is described below.

In the initial state, the group table is empty, and hence includes no representative directed graph to be compared with the directed graph 1 421. Accordingly, the computer system registers the directed graph 1 421 as the first element in the group table, so as to be a representative directed graph of a new group. Moreover, the computer system further registers 20, which is the execution frequency of the loop 1 411, and the directed graph 1 421, as the first element in the group table.

Thus, the first element in the group table results in as follows through the registration.

| Group table (1) | |
| --- | --- |
| Representative directed graph | Directed graph 1 |
| Execution frequency | 20 |
| Belonging graph | Directed graph 1 |

Subsequently, the computer system judges similarity for the directed graph 2 422.

The computer system compares the directed graph 2 422 with each representative directed graph registered in the group table. The representative directed graph to be compared with in this case is the directed graph 1 421. The computer system uses the TEA to the comparison. The computer system applies the pair of {directed graph 1, directed graph 2} to the parameters of the TEA, and thereby performs verification. Since the directed graph 2 422 does not include all nodes included in the directed graph 1 421, the result of the verification is failure. Then, the computer system applies the pair of {directed graph 2, directed graph 1} to the parameters of the TEA, and thereby performs verification. Since the directed graph 1 421 does not include all the nodes included in the directed graph 2 422, the result of the verification is again failure. Accordingly, the computer system registers the directed graph 2 422 as the second element in the group table, so as to be a representative directed graph of a new group. Moreover, the computer system further registers 25, which is the execution frequency of the loop 2 412, and the directed graph 2 422, as the second element in the group table.

Thus, the second element in the group table results in as follows through the registration.

| Group table (2) | |
| --- | --- |
| Representative directed graph | Directed graph 2 |
| Execution frequency | 25 |
| Belonging graph | Directed graph 2 |

Subsequently, the computer system judges similarity for the directed graph 3 423. The computer system compares the directed graph 3 423 with each representative directed graph registered in the group table. The representative directed graphs to be compared with in this case are the directed graph 1 421 and the directed graph 2 422. Firstly, the computer system compares the directed graph 3 423 with the directed graph 1 421, which is the representative directed graph in the first element. The computer system uses the TEA for the comparison. The computer system applies the pair of {directed graph 1, directed graph 3} to the parameters of the TEA, and performs verification.

Since the directed graph 3 423 includes all the nodes included in the directed graph 1 421 and also includes, between each pair of all the nodes, paths that are the same as those included in the directed graph 1 421, the result of the verification is success. Here, the loop 1 411 and the loop 3 413 are not the same algorithm but are different algorithms. Consequently, the computer system updates the first element in the group table. In the update, the computer system adds 20, which is the execution frequency of the loop 3 413, to the execution frequency in the first element in the group table. Moreover, the computer system registers the directed graph 3 423 in the first element in the group table.

Thus, the first element in the group table results in as follows through the registration.

| Group table (1) | |
| --- | --- |
| Representative directed graph | Directed graph 1 |
| Execution frequency | 40 |
| Belonging graph | Directed graph 1 and directed graph 3 |

Since the directed graph 3 423 is registered in the group table, the computer system does not need to compare the directed graph 3 423 with any representative graph registered in the second element of the group table or thereafter.

Subsequently, the computer system judges similarity for the directed graph 4 424.

The computer system compares the directed graph 4 424 with each representative directed graph registered in the group table. The representative directed graphs to be compared with in this case are the directed graph 1 421 and the directed graph 2 422. Firstly, the computer system compares the directed graph 4 424 with the directed graph 1 421, which is the representative directed graph in the first element in the group table. The computer system uses the TEA for the comparison.

The computer system applies the pair of {directed graph 1, directed graph 4} to the parameters of the TEA, and thereby performs verification. Since the directed graph 4 424 does not include all the nodes included in the directed graph 1 421, the result of the verification is failure. Then, the computer system compares the directed graph 4 424 with the directed graph 2 422, which is the representative directed graph in the second element in the group table. The computer system uses the TEA for the comparison.

The computer system applies the pair of {directed graph 2, directed graph 4} to the parameters of the TEA, and thereby performs verification. Since the directed graph 4 424 does not include all the nodes included in the directed graph 2 422, the result of the verification is failure. Then, the computer system compares the directed graph 4 424 with the directed graph 1 421, which is the representative directed graph in the first element in the group table. The computer system uses the TEA for the comparison.

The computer system applies the pair of {directed graph 4, directed graph 1} to the parameters of the TEA, and performs verification. Since the directed graph 1 421 does not include all the nodes included in the graph 4 424, the result of the verification is failure. Then, the computer system compares the directed graph 4 424 with the directed graph 2 422, which is the representative directed graph in the second element in the group table. The computer system uses the TEA for the comparison. The computer system applies the pair of {directed graph 4, directed graph 2} to the parameters of the TEA, and performs verification. Since the directed graph 2 422 includes all the nodes included in the directed graph 4 424 and also includes, between each pair of all the nodes, paths that are the same as those included in the directed graph 4 424, the result of the verification is success. Consequently, the computer system updates the second element in the group table. In the update, the computer system replaces the directed graph 2 422 with the directed graph 4 424, as the representative directed graph in the second element in the group table. Moreover, the computer system adds 5, which is the execution frequency of the loop 4 414, to the execution frequency in the second element in the group table. Furthermore, the computer system registers the directed graph 4 424 in the second element in the group table.

Thus, the second element in the group table results in as follows through the registration.

| Group table (2) | |
|---|---|
| Representative directed graph | Directed graph 4 |
| Execution frequency | 30 |
| Belonging graph | Directed graph 2 and directed graph 4 |

Through the above processing, the directed graphs 1 to 4 421 to 424 are registered in the group table.

The group table at the time when all the registrations of the directed graphs 1 to 4 421 to 424 are completed is as follows.

| Group table (1) | |
|---|---|
| Representative directed graph | Directed graph 1 |
| Execution frequency | 40 |
| Belonging graph | Directed graph 1 and directed graph 3 |

| Group table (2) | |
|---|---|
| Representative directed graph | Directed graph 4 |
| Execution frequency | 30 |
| Belonging graph | Directed graph 2 and directed graph 4 |

In terms of individual execution frequencies of the respective loops 1 to 4 411 to 414, the loop 2 412 has the highest execution frequency. However, when similar loops are grouped, such a result is obtained that the execution frequency of the loops having the patterns as those of the loop 1 411 and the loop 3 413 is higher than that of the loops having other patterns. This is the effect which can be obtained by grouping similar algorithms.

Lastly, the computer system displays, for example, for each of the elements in the group table, the loop corresponding to the representative directed graph and the execution frequency of the loop, the graphs and the execution frequencies arranged in descending order of the frequencies.

FIG. 4C shows examples of a display result in an embodiment of the present invention.

Groups registered at the time when all the above registrations are completed are the following two groups: the group registered in the group table (1) (a first group, below); and the group registered in the group table (2) (a second group, below. Here, the execution frequency of the first group is 40 and the execution frequency of the second group is 30. Accordingly, if the groups are displayed in descending order of the execution frequencies, the group 1 and the group 2 are displayed in this order.

In a display example 431, the execution frequency of the group 1 is shown in the first line, and the algorithm corresponding to the directed graph 1, which is the representative directed graph of the group 1, is shown in the second to the fifth lines. Then, the execution frequency of the group 2 is shown in the sixth line, and the algorithm corresponding to the directed graph 4, which is the representative directed graph of the group 2, is shown in the seventh to ninth lines.

In a display example 432, "loop 1," is an identifier corresponding to the representative directed graph of the group 1. It is shown in the first line. The execution frequency of the group 1 is shown in the second line, and the algorithm corresponding to the directed graph 1, which is the representative directed graph of the group 1, is shown in the third to sixth lines. Then, "loop 1" and "loop 3," which are identifiers corresponding respectively to the graphs belonging to the group 1, are shown in the seventh line. Then, "loop 4," which is an identifier corresponding to the representative directed graph of the group 2, is shown in the eighth line. The execution frequency of the group 2 is shown in the ninth line, and the algorithm corresponding to the directed graph 4, which is the representative directed graph of the group 2, is shown in the tenth and twelfth lines. Then, "loop 2" and "loop 4," which are identifiers corresponding respectively to the graphs belonging to the group 1, are shown in the thirteenth line.

With such a display, a user can easily find the pattern of a loop having a high execution frequency. Consequently, the user can find a program which needs to be optimized with a high priority.

In an embodiment of the present invention, a computer system presents either nodes or edges included in each directed graph, as a bitmap. In the following example, nodes representing instructions are presented as a bitmap. Here, the nodes representing instructions are, for example, a node representing an operator in an AST and a node in a CFG.

In judgment on similarity, the computer system firstly investigates inclusion relationships between the bitmaps. The computer system can exclude each pair of graphs presented by bitmaps having no inclusion relationship, from pairs of directed graphs for which the TEA is to be used. This can reduce time to analyze the program.

FIG. 5 shows an example of the bitmaps in this embodiment of the present invention.

A table 501 presents nodes respectively representing instructions included in each of directed graphs 1 to 4 (421 to 424 in FIG. 4B) as a bit map. Each row of the table 501 represents a directed graph. Each column of the table 501 represents a node representing an instruction. In each cell of the table 501, 1 is set when the directed graph includes the node representing the corresponding instruction, and 0 is set when the directed graph does not including the node.

For example, the directed graph 421 includes "IF<," "load," "If==," "add" and "assign." The directed graph 421 does not include "store."

By using the bit maps, the computer system can quickly judge whether all instructions included in a certain directed graph (a directed graph A, below) are included in another directed graph (a directed graph B, below).

In order to make the judgment quickly, the computer system performs the logical AND (AND) between the bitmap of the directed graph A and the bitmap of the directed graph B. The computer system compares the bit map of the directed graph A with the bit map of the result of the AND. If the bit map of the directed graph A is the same as the bitmap of the result of the AND, the computer system judges that the directed graph B includes all the instructions included in the directed graph A. If the bit map of the directed graph A is not the same as the bitmap of the result of the AND, the computer system judges that the directed graph B does not include all the instructions included in the graph A. In the case of the latter judgment, the computer system does not need to use the TEA for the pair {directed graph A, directed graph B}.

For example, the bitmap of the result of AND between the bitmap of the directed graph 421 and the directed graph 422 is 100101. Here, 100101 is different from 111101, which is the bitmap of the directed graph 1 421. Accordingly, the directed graph 422 does not include all the instructions included in the directed graph 421. Thus, no analysis using the TEA is performed on the pair of {directed graph 421, directed graph 422}.

Meanwhile, the bitmap of the result of AND between the bitmap of the directed graph 421 and the bitmap of the directed graph 423 is 111101. Here, 111101 is the same as 111101, which is the bitmap of the directed graph 421. Accordingly, the directed graph 423 includes all the instructions included in the directed graph 421. Thus, an analysis using the TEA is to be performed on the pair of {directed graph 421, directed graph 423}.

As described above, candidates which are similar to each other can be selected quickly by investigating inclusion relationships by use of bitmaps.

According to an embodiment of the present invention, time to analyze a program can be reduced by setting a maximum number N of groups by a user. When a user sets the maximum number N, the computer system keeps with a high priority, in the group table, groups having a high execution frequency of all directed graphs included therein.

In an embodiment of the present invention, a computer system may be configured to delete, from the group table, a group having the smallest execution frequency of all directed graphs included therein, when the number of groups has reached the maximum number N.

In another embodiment, the computer system may be configured to merge groups having representative directed graphs similar to each other, when the number of groups has reached the maximum number N. In the merger, the computer system similarity is judged on representative directed graphs belonging respectively to the groups. This similarity judgment may be the same as that performed by the judgment unit. When judging that representative directed graphs are similar, the computer system merges the groups to which the representative directed graphs judged to be similar belong (similar groups, below). Here, among the representative directed graphs belonging to the similar groups, the representative directed graph having the smallest number of nodes is set to be the representative directed graphs of the group obtained by the merger. Moreover, the total value of the execution frequencies of all the directed graphs belonging to the similar groups serves as the execution frequency of all the directed graphs belonging to the group obtained by the merger. Furthermore, all the directed groups belonging to the similar groups serve as the directed graphs belonging to the group obtained by the merger.

According to an embodiment of the present invention, a computer system can restore a directed graph to an algorithm.

In an embodiment of the present invention, a pointer may be used to restore a directed graph to an algorithm. The computer system stores a pointer which indicates the location of an algorithm in a program, when converting the algorithm into the directed graph. The computer system stores the pointer in a group table together with the directed graph. The computer system can acquire the algorithm corresponding to the directed graph by referring to the stored pointer.

Figure 6:
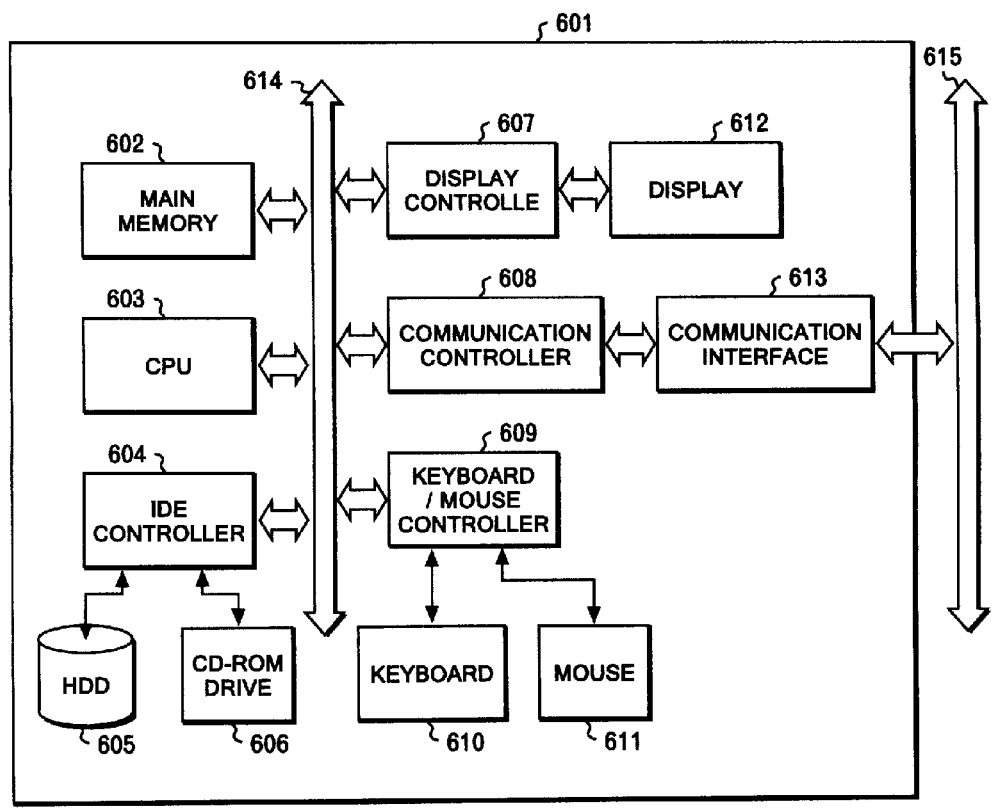
FIG. 6 shows a block diagram of computer hardware, in an embodiment of the present invention.

FIG. 6 is a block diagram of computer hardware in an embodiment of the present invention. A computer system 601 includes a CPU 603 and a main memory 602, which are connected to a bus 614. The CPU 603 is preferably based on a 32-bit architecture or a 64-bit architecture, and used for the CPU 603 can be, for example, Xeon (trademark) series, Core (trademark) series, Atom (trademark) series, Pentium (trademark) series or Celeron (trademark) series from Intel Corporation, or Phenom (trademark) series, Athlon (trademark) series, Turion (trademark) series or Sempron (trademark) from Advanced Micro Devices, Inc.

To the bus 614, a display 612 such as an LCD monitor is connected through a display controller 607. The display 612 is used to display, for computer system management, information on each computer system connected to a network through a communication line and information on software operating on the computer system, by using a suitable graphic interface. To the bus 614, a hard disk or a silicon disk 605 and a CD-ROM, DVD drive or BD drive 606 are connected through an IDE or SATA controller 604.

To the hard disk 605, an operating system, a program and data are stored so as to be loadable into a main memory.

The CD-ROM, DVD or BD drive 606 is used to additionally install a program in the hard disk from a CD-ROM, a DVD-ROM or a BD, as needed. To the bus 614, a keyboard 610 and a mouse 611 are further connected through a keyboard/mouse controller 609.

A communication interface 613 is based on Ethernet (trademark protocol). The communication interface 613 is connected to the bus 614 through a communication controller 608, and functions to physically connect the computer system and a communication line 615. Thus, the communication interface 613 provides a network interface layer to TCP/IP communication protocol of a communication function of the operating system of the computer system. Here, the communication line may be a wired LAN environment, or a wireless LAN environment based on a wireless LAN connection standard such as IEEE 802.11a/b/g/n, for example.

According to the embodiments of the present invention, similar logics are extracted on the basis of the contexts of a program. This extraction will be a great help when a developer analyzes the performance of a program.

Although the preferred embodiments of the present invention have been described in detail, it should be understood that various changes, substitutions and alternations can be made therein without departing from spirit and scope of the inventions as defined by the appended claims.

What is claimed is:

1. A method for grouping algorithms included in a program into groups to assist in analyzing the program, the method comprising the steps of:
  converting each of the algorithms into a directed graph, the directed graph including a plurality of nodes and one or more edges each connecting two of the nodes;
  calculating similarity between the directed graph obtained by the conversion and each of a plurality of representative directed graphs corresponding respectively to the groups and stored in a storage unit of a computer system, wherein the calculation of the similarity includes dividing N1 by (N1+N2), where:

N1 is at least one of the number of nodes included in both the directed graph obtained by the conversion and the representative directed graph and the number of paths between the nodes corresponding to N1, and N2 is at least one of the number of nodes included in one of the directed graph obtained by the conversion and the representative directed graph and the number of paths each having any one of the nodes corresponding to N2 as a start point or an end point;

judging, as to each of the representative directed graphs, that the directed graph obtained by the conversion is similar to the representative directed graph when the calculated similarity exceeds a threshold, wherein the representative directed graph is a directed graph including the smallest number of the nodes among directed graphs belonging to the corresponding group; and determining a group to which the directed graph obtained by the conversion belongs from among the groups stored in the storage unit in accordance with the similarity judgment.

2. The method according to claim 1, wherein the judging step includes the step of determining that the directed graph obtained by the conversion is similar to the representative directed graph when the following conditions are present:

the directed graph obtained by the conversion includes at least a first node and a second node and a first path from the first node to the second node, the representative directed graph includes at least third node and a fourth node and a second path from the third node to the fourth node, the third node corresponds to the first node, and the fourth node corresponds to the second node.

3. The method according to claim 1, wherein the judging step includes determining that the directed graph obtained by the conversion is similar to the representative directed graph when one directed graph of the directed graph obtained by the conversion and the representative directed graph includes all nodes corresponding to the nodes included in the other directed graph, and all paths between the nodes included in the other directed graph correspond respectively to some of or all of paths between the nodes included in the one directed graph.

4. The method according to claim 1, wherein the judging step includes the steps of:

converting, into a bitmap, the nodes or one or more edges included in each of the directed graph obtained by the conversion and the representative directed graph; and determining that the directed graphs are not similar when the bitmaps of the directed graphs are not in an inclusion relationship.

5. The method according to claim 1, further comprising the step of calculating execution frequency of a group on the basis of execution frequency of the determined group, the execution frequency stored in the storage unit, and execution frequency of the directed graph obtained by the conversion.

6. The method according to claim 5, wherein the calculation step includes the step of calculating the execution frequency of the group on the basis of a value calculated from the execution frequency of the determined group, the execution frequency stored in the storage unit, and a value calculated from the execution frequency of the directed graph obtained by the conversion.

7. The method according to claim 5, further comprising the step of displaying, for each of the groups, an algorithm corresponding to the representative directed graph and execution frequency of the group to which the representative directed graph belongs.

8. The method according to claim 7, further comprising the step of displaying, for each of the groups, the algorithm corresponding to the representative directed graph, the algorithms displayed in descending order of the execution frequencies of the respective groups.

9. The method according to claim 8, wherein the displaying step further includes displaying, for each of the groups, an identifier corresponding to the representative directed graph.

10. The method according to claim 1, further comprising the step of registering execution frequency of the directed graph obtained by the conversion, in the determined group, when the directed graph obtained by the conversion is similar to the representative directed graph.

11. The method according to claim 10, further comprising the step of updating the representative directed graph of the determined group with a directed graph having the smallest number of the nodes between the directed graph obtained by the conversion and the representative directed graph of the determined group.

12. The method according to claim 10, wherein the registering step further includes the step of setting, the directed graph obtained by the conversion and the execution frequency of the directed graph obtained by the conversion respectively as a representative directed graph of a new group and execution frequency of the new group when the directed graph obtained by the conversion is not similar to the representative directed graph.

13. The method according to claim 12, wherein the registering step further includes the step of storing the representative directed graph and the execution frequency of the new group in the storage unit.

14. The method according to claim 1, wherein the judging step includes determining whether a first representative directed graph belonging to a first group stored in the storage unit is similar to a second representative directed graph belonging to a second group stored in the storage unit.

15. The method according to claim 14, further comprising the step of merging the first group and the second group when the first representative directed graph is similar to the second representative directed graph.

16. The method according to claim 14, further comprising the steps of:

merging the first group and the second group and setting, as a representative directed graph belonging to a group obtained by the merger, a representative directed graph having the smallest number of the nodes between the first representative directed graph and the second representative directed graph, when the first representative directed graph is similar to the second representative directed graph; and calculating execution frequency of the group obtained by the merger, on the basis of execution frequency of the first group and execution frequency of the second group.

17. The method according to claim 1, further comprising the step of merging a first group and a second group stored in the storage unit when the number of the groups reaches a predetermined value.

18. The method according to claim 5, further comprising the step of deleting a group having the lowest execution frequency from the storage unit when the number of the groups reaches a predetermined value.

19. The method according to claim 1, wherein the conversion step includes the step of further converting the directed graph back into the algorithm.

20. A non-transitory computer readable article of manufacture tangibly embodying a computer readable program which, when executed by a computer will cause the computer to perform the method comprising the steps of:
converting each of the algorithms into a directed graph, the directed graph including a plurality of nodes and one or more edges each connecting two of the nodes;
calculating similarity between the directed graph obtained by the conversion and each of a plurality of representative directed graphs corresponding respectively to the groups and stored in a storage unit of a computer system, wherein the calculation of the similarity includes dividing N1 by (N1+N2), where:
N1 is at least one of the number of nodes included in both the directed graph obtained by the conversion and the representative directed graph and the number of paths between the nodes corresponding to N1, and
N2 is at least one of the number of nodes included in one of the directed graph obtained by the conversion and the representative directed graph and the number of paths each having any one of the nodes corresponding to N2 as a start point or an end point;
judging, as to each of a plurality of representative directed graphs corresponding respectively to the groups and stored in a storage unit of a computer system, that the directed graph obtained by the conversion is similar to the representative directed graph when the calculated similarity exceeds a threshold, wherein the representative directed graph is a directed graph including the smallest number of the nodes among directed graphs belonging to the corresponding group; and
determining a group to which the directed graph obtained by the conversion belongs from among the groups stored in the storage unit in accordance with the similarity judgment.

21. A computer system for grouping algorithms included in a program into groups to assist in analyzing the program, the computer system comprising:
a conversion unit configured to convert each of the algorithms into a directed graph, the directed graph including a plurality of nodes and one or more edges each connecting two of the nodes;
a storage unit configured to store at least one directed graph belonging to at least one group;
a calculation unit configured to calculate similarity between the directed graph obtained by the conversion and each of a plurality of representative directed graphs corresponding respectively to the groups and stored in a storage unit of a computer system, wherein the calculation of the similarity includes dividing N1 by (N1+N2), where:
N1 is at least one of the number of nodes included in both the directed graph obtained by the conversion and the representative directed graph and the number of paths between the nodes corresponding to N1, and
N2 is at least one of the number of nodes included in one of the directed graph obtained by the conversion and the representative directed graph and the number of paths each having any one of the nodes corresponding to N2 as a start point or an end point;
a judgment unit configured to judge, as to each of the representative directed graphs, that the directed graph obtained by the conversion is similar to the representative directed graph when the calculated similarity exceeds a threshold, the representative directed graph being a directed graph including the smallest number of the nodes among directed graphs belonging to the corresponding group; and
a determination unit configured to determine a group to which the directed graph obtained by the conversion belongs from among the groups stored in the storage unit in accordance with the similarity judgment.

* * * * *